(12) United States Patent
Michaud et al.

(10) Patent No.: US 11,873,429 B2
(45) Date of Patent: Jan. 16, 2024

(54) HOT-MELT PRESSURE-SENSITIVE ADHESIVE COMPOSITION BASED ON POLYURETHANE/(METH)ACRYLIC

(71) Applicant: BOSTIK SA, Colombes (FR)

(72) Inventors: Guillaume Michaud, Venette (FR); Aurelien Wiegand, Venette (FR); Stephane Fouquay, Venette (FR)

(73) Assignee: Bostik SA, Colombes (FR)

( * ) Notice: Subject to any disclaimer, the term of this patent is extended or adjusted under 35 U.S.C. 154(b) by 598 days.

(21) Appl. No.: 16/905,976

(22) Filed: Jun. 19, 2020

(65) Prior Publication Data

US 2020/0407601 A1    Dec. 31, 2020

(30) Foreign Application Priority Data

Jun. 27, 2019  (FR) ........................... 1907003

(51) Int. Cl.
| | |
|---|---|
| C09J 7/38 | (2018.01) |
| B05D 3/06 | (2006.01) |
| B05D 5/10 | (2006.01) |
| C09J 175/12 | (2006.01) |
| C08K 5/105 | (2006.01) |
| C08K 5/01 | (2006.01) |
| C09J 7/35 | (2018.01) |
| C09J 175/08 | (2006.01) |
| C08K 5/00 | (2006.01) |
| C09J 175/16 | (2006.01) |

(52) U.S. Cl.
CPC ................ *C09J 7/38* (2018.01); *B05D 3/067* (2013.01); *B05D 3/068* (2013.01); *B05D 5/10* (2013.01); *C08K 5/005* (2013.01); *C08K 5/01* (2013.01); *C08K 5/105* (2013.01); *C09J 7/35* (2018.01); *C09J 175/08* (2013.01); *C09J 175/12* (2013.01); *C09J 175/16* (2013.01); *C09J 2301/302* (2020.08); *C09J 2301/304* (2020.08); *C09J 2301/312* (2020.08); *C09J 2475/00* (2013.01)

(58) Field of Classification Search
CPC .......... B05D 3/067; B05D 3/068; B05D 5/10; C08G 18/10; C08G 18/12; C08G 18/227; C08G 18/4812; C08G 18/4829; C08G 18/672; C08G 18/621; C08G 2170/20; C08G 2170/40; C08K 5/005; C08K 5/01; C08K 5/105; C08K 5/5313; C08L 2205/03; C08L 45/00; C09J 7/21; C09J 7/225; C09J 7/35; C09J 7/38; C09J 11/06; C09J 11/08; C09J 175/16; C09J 2203/334; C09J 2301/302; C09J 2301/304; C09J 2301/312; C09J 2400/283; C09J 2467/006; C09J 2475/00

See application file for complete search history.

(56) References Cited

U.S. PATENT DOCUMENTS

| | | | |
|---|---|---|---|
| 6,429,235 B1 * | 8/2002 | Varlemann | C07C 69/54 522/42 |
| 7,932,302 B2 * | 4/2011 | Lu | C08G 18/672 528/65 |
| 10,428,245 B2 * | 10/2019 | Michaud | C08G 18/4866 |
| 2009/0324961 A1 * | 12/2009 | Lu | C08G 18/672 522/90 |

FOREIGN PATENT DOCUMENTS

| | | |
|---|---|---|
| EP | 1208178 A1 | 1/2007 |
| WO | 2015083795 A1 | 6/2015 |
| WO | WO-2015083795 A1 * | 6/2015 .......... C08F 290/067 |

OTHER PUBLICATIONS

INPI; Preliminary Search Report for French Patent Application No. 1907003 dated Mar. 5, 2020, 12 pages.

* cited by examiner

*Primary Examiner* — Sanza L. McClendon
(74) *Attorney, Agent, or Firm* — NK Patent Law

(57) ABSTRACT

A hot-melt pressure-sensitive adhesive composition comprises:
a) at least one polyurethane comprising at least two end functional groups T of following formula (I):

$$-X-(C=O)-CH(R^r)=CH_2 \qquad (I)$$

b) at least one tackifying resin chosen from the following resins:
  (b1) terpene/phenolic resins;
  (b2) the resins resulting from the polymerization of α-methylstyrene, optionally followed by a reaction with at least one phenol;
  (b3) the polymeric resins (optionally at least partially hydrogenated) resulting from mainly $C_9$ aromatic fractions; and
c) at least one polymerization inhibitor.

The polyurethane(s) (a): tackifying resin(s) (b) ratio by weight ranges from 4:6 to 6:4. The said polyurethane (a) has a mean functionality of functional groups of formula (I) strictly of greater than 1.9.

18 Claims, No Drawings

HOT-MELT PRESSURE-SENSITIVE ADHESIVE COMPOSITION BASED ON POLYURETHANE/(METH)ACRYLIC

CROSS-REFERENCE TO RELATED APPLICATIONS

This application claims the benefit of French Patent Application No. 1907003, filed Jun. 27, 2019, the entire contents of which are incorporated by reference herein.

FIELD OF THE INVENTION

The present invention relates to a hot-melt pressure-sensitive adhesive (or HMPSA) composition based on polyurethane/(meth)acrylic.

The invention also relates to its uses.

TECHNOLOGICAL BACKGROUND

Pressure-sensitive adhesives (PSAs) are substances which confer, on the support which is coated with them, an immediate tack at ambient temperature. This immediate tack makes possible the instantaneous adhesion of the said self-adhesive support to all types of substrates, under the effect of a gentle and brief pressure. Due to its adhesiveness, normally evaluated by a peel test, the said self-adhesive support is then firmly attached to the said substrate by means of an adhesive seal.

PSAs are widely used in the manufacture of self-adhesive articles, such as, for example, self-adhesive labels which are attached to articles for purposes of presentation of information (such as barcode, name, price) and/or for decorative purposes. PSAs are also employed in the manufacture of self-adhesive tapes of varied uses. Mention may be made, for example, besides the transparent adhesive tape widely used in daily life, of the forming and the assembling of cardboard packagings; the protection of surfaces for painting operations, in the building industry; the maintenance of electric cables in the transportation industry; the adhesive bonding of fitted carpets by double-sided adhesive tapes.

For the purpose of the manufacture of self-adhesive labels and/or tapes, PSAs are often applied by continuous coating processes over the whole of the surface of a large-sized support layer (if appropriate printable), in the proportion of an amount (generally expressed in g/m²) denoted below by the term of "weight per unit area". The support layer is, for example, paper or a film consisting of a polymeric material having one or more layers. The layer of self-adhesive composition which covers the support layer can itself be covered with a protective non-stick layer (often known as release liner), for example consisting of a silicone film. The multilayer system obtained is generally packaged by winding in the form of large reels having a width of up to two metres and having a diameter of one metre, which can be stored and transported.

These multilayer systems can subsequently be converted into self-adhesive labels which can be applied by the final user, by means of transformation processes which include the printing of desired informative and/or decorative elements onto the printable face of the support layer, followed by cutting to the desired shape and sizes. The protective non-stick layer can be easily removed without modifying the adhesive layer, which remains attached to the support layer. After separation from its non-stick protective layer, the label is applied to the article to be coated either manually or with the aid of labelling machines on automated packaging lines.

These multilayer systems can also be converted into self-adhesive tapes by cutting and packaging as rolls of predetermined width and length.

PSAs make possible, due to their high ambient-temperature tack, rapid holding or attachment of the self-adhesive label and/or tape to the substrate (or article) to be coated (for example, as regards labels, on bottles, or else, as regards tapes, on packing boards to be formed), suitable for the achievement of high industrial production rates.

In the context of the present patent application, interest is directed at a specific category of PSAs: HMPSAs or Hot-Melt Pressure-Sensitive Adhesives, which are hot-melt adhesives which possess properties at least comparable with PSAs, in particular in terms of adhesive force, of tack and of self-adhesion.

Typically, the compositions based on these adhesives are solid or virtually solid at ambient temperature and have to be melted before deposition (or coating) on a support. After cooling and optionally crosslinking of the composition applied, the support is coated with an adhesive seal having a tack which advantageously makes possible its instantaneous adhesion to a substrate under the effect of a gentle and brief pressure.

There exist hot-melt pressure-sensitive adhesive compositions based on polyurethane comprising —NCO end groups. However, these compositions often comprise a residual amount of diisocyanate compounds of lower molar mass originating from the diisocyanate monomers (with a molar mass of less than 300 g/mol) used in excess and which have not reacted during the synthesis of the polyurethane. It has been observed that the majority of the crosslinkable hot-melt adhesive compositions of the prior art based on polyurethane having NCO end groups are formulated from the polyurethane obtained directly after synthesis and, for this reason, contain all of the residual (unreacted) diisocyanate monomers resulting from the synthesis of the polyurethane. In the end, the adhesive composition can comprise more or less significant amounts of diisocyanate monomers, which can result in a number of problems, including, inter alia, a risk of toxicity for man and his environment. This is because the presence of a residual content of free diisocyanate monomers can generate, in the presence of moisture, primary aromatic amines which are potentially harmful to the health when they are of aromatic nature (PAAs). For aliphatic diisocyanates, such as hexamethylene diisocyanate (HDI, with a molar mass equal to 168 g/mol approximately) or isophorone diisocyanate (IPDI, with a molar mass equal to 222 g/mol approximately), and for aromatic diisocyanates, such as toluene diisocyanate (TDI, with a molar mass equal to 174 g/mol approximately) or diphenylmethane diisocyanate (MDI, with a molar mass equal to 250 g/mol approximately), this limiting content has been set at 0.1% by weight of the product in regulatory terms. The amount of these diisocyanates and of their corresponding amines can be evaluated in a well-known way by a person skilled in the art using practical tests under standard conditions.

There also exist PSA adhesive compositions which can be crosslinked by UV radiation, based on acrylic, styrene or urethane block copolymers. These compositions exhibit certain disadvantages during the treatment and the formation of films. Acrylic-based PSA systems are generally adhesive systems of hot-melt (HMPSA) type, adhesive systems based on solvent or adhesive systems based on water which facilitate a coating process. PSA systems based on solvent contain volatile organic compounds which are difficult to evaporate. Such a difficulty limits their application due to environmental and performance requirements. The presence of a large or residual content of free hydroxylated (meth) acrylic monomers can also generate toxic emissions and cause problems of irritation and of sensitization by the pulmonary route (asthma) or skin route (allergic contact dermatitis) for man during the use of the adhesive composition, in particular during the application of the latter. In order to effectively combat this exposure to the monomers, specific measures have to be taken, for example the introduction of individual protective measures in order to prevent any contact with the skin (mask and respirator, impermeable and chemically resistant and impermeable clothing) and collective protective measures (ventilated premises). However, this causes additional costs and constraints, running counter to the provision of an economical and profitable industrial preparation process. In addition, when it is envisaged to use reactive adhesives based on polyurethane/(meth) acrylic(s) in the preparation of adhesive films for packagings intended for foodstuffs, it is desirable for these adhesives to contain reduced contents of (meth)acrylic monomers and of diisocyanate monomers as these are capable of migrating, for example through the packaging layers, and of contaminating the contents of the packaging in contact with the latter.

For hydroxyalkyl (meth)acrylates, such as 2-hydroxyethyl acrylate, 2-hydroxypropyl acrylate, 2-hydroxyethyl methacrylate and 2-hydroxypropyl methacrylate, this limiting content has been set at less than 0.2% by weight of the product, preferentially at less than 0.02% by weight of the product; and, for hydroxyalkyl(meth)acrylamides, such as (2-hydroxyethyl)acrylamide or (2-hydroxypropyl)acrylamide, this value has been set at less than 0.1% by weight of the product.

The majority of adhesive compositions comprising polyurethane/(meth)acrylates are thus not entirely satisfactory. Due in particular to the abovementioned disadvantages, the majority of regulations require the labelling of any product containing a content of certain compounds greater than a certain authorized limit.

There thus exists a need to make available HMPSA compositions based on polyurethane/(meth)acrylic(s) which make it possible to overcome, at least in part, at least one of the abovementioned disadvantages.

In particular, there exists a need to make available HMPSA compositions based on polyurethane/(meth) acrylic(s) having a reduced content of free or residual (meth)acrylic monomers and diisocyanate monomers, in particular in a content lower than the regulatory labelling thresholds, and which result in pressure-sensitive adhesives having good adhesive properties.

DESCRIPTION OF THE INVENTION

A. Composition

The present invention relates to a hot-melt pressure-sensitive adhesive composition comprising:
(a) at least one polyurethane comprising at least two end functional groups T of following formula (I):

[Chem 1]

in which $R^V$ represents a hydrogen atom or a methyl radical and X represents —O— or —NR$^{rN}$— with R$^{rN}$ representing a hydrogen atom or a linear or branched alkyl radical comprising from 1 to 20 carbon atoms, preferably from 1 to 12 carbon atoms, preferentially from 1 to 8 carbon atoms, X advantageously representing —O—;

(b) at least one tackifying resin chosen from the following resins:
(b1) terpene/phenolic resins;
(b2) the resins resulting from the polymerization of α-methylstyrene, optionally followed by a reaction with at least one phenol;
(b3) the polymeric resins (optionally at least partially hydrogenated) resulting from mainly $C_9$ aromatic fractions; and
(c) at least one polymerization inhibitor;
the said composition being characterized in that:
the polyurethane(s) (a): tackifying resin(s) (b) ratio by weight ranges from 4:6 to 6:4; and
the said polyurethane (a) has a mean functionality of functional groups of formula (I) strictly of greater than 1.9, preferably of greater than or equal to 2.

In the present patent application, unless otherwise indicated:
the amounts expressed in the percentage form correspond to weight/weight percentages;
the number-average molar masses (Mn) of the tackifying resins, expressed in daltons (Da), are determined by gel permeation chromatography (GPC), the column being calibrated with polystyrene standards (PSs);
the hydroxyl number of an alcohol compound or of a tackifying resin represents the number of hydroxyl functional groups per gram of product, which is expressed in the form of the equivalent number of milligrams of potassium hydroxide (KOH) used in the assaying of the hydroxyl functional groups per gram of product;
the measurement of viscosity at 23° C. can be carried out using a Brookfield viscometer according to Standard ISO 2555. Typically, the measurement carried out at 23° C. can be performed using a Brookfield RVT viscometer with a spindle suited to the viscosity range and at a rotational speed of 20 revolutions per minute (rev/min). The viscosity of a product is preferably measured at least 24 hours after manufacture of the said product;
the number-average molecular weights (Mn) of the polyols, expressed in g/mol, are calculated from their hydroxyl numbers and from their functionalities.

Polyurethane (a)

Preferably, the abovementioned end functional groups T of formula (I) are found on the ends of the main chain of the polyurethane.

The total content by weight of polyurethane(s) (a) in the composition can range from 30% to 70% by weight, preferably from 35% to 65% by weight, more preferentially from 40% to 60% by weight, with respect to the total weight of the composition.

The term "mean functionality of functional groups of formula (I)" is understood to mean the mean number of functional groups of formula (I) per mole of polyurethane (a).

The polyurethane (a) preferably has a viscosity at 23° C. ranging from 10 000 to 100 000 mPa·s (millipascal·second) and more preferentially a viscosity of less than 50 000 mPa·s.

The abovementioned polyurethane (a) comprising at least two end functional groups T can be obtained by reaction of a polyurethane comprising at least two —NCO end functional groups (preferably at the ends of the main chain) and of at least one compound chosen from a hydroxylated ester of (meth)acrylic acid or a hydroxylated amide of (meth) acrylic acid.

In the context of the invention, and unless otherwise mentioned, the term "hydroxylated ester of (meth)acrylic acid" is understood to mean an acrylic acid or methacrylic acid ester, the ester radical of which is substituted by at least one hydroxyl group. A hydroxylated ester of (meth)acrylic acid can, for example, be represented by the following formula:

[Chem 2]

$$CH_2=CR^V-C(=O)-O-R^O$$

in which $R^V$ represents a hydrogen atom or a methyl radical and $R^O$ represents an organic radical substituted by at least one hydroxyl group.

According to one embodiment, the hydroxylated ester of (meth)acrylic acid has the following formula (II):

[Chem 3]

$$CH_2=CR^V-C(=O)-O-R^{AC}-OH \quad (II)$$

in which $R^V$ represents a hydrogen atom or a methyl radical and $R^{AC}$ represents a saturated or unsaturated, aliphatic or cyclic, linear or branched, divalent hydrocarbon radical preferably comprising from 2 to 240 carbon atoms, and/or optionally interrupted by one or more heteroatoms (such as, for example, N, O or S, and in particular O), and/or optionally interrupted by one or more divalent —N($R^{"N}$)— with $R^{"N}$ representing a linear or branched alkyl radical comprising from 1 to 22 carbon atoms (tertiary amine), —C(=O)O— (ester), —C(=O)NH— (amide), —NHC(=O)O— (carbamate), —NHC(=O)—NH— (urea) or —C(=O)— (carbonyl) groups, and/or optionally substituted.

Preferably, the hydroxylated ester of (meth)acrylic acid has one of the following formulae:

[Chem 4]

•Formule(II-1): $CH_2=CR^V-C(=O)-O-R^{AC1}-OH$ (II-1)

in which $R^V$ represents a hydrogen atom or a methyl radical and $R^{AC1}$ represents a saturated or unsaturated, aliphatic or cyclic, linear or branched, divalent hydrocarbon radical comprising from 2 to 22 carbon atoms, preferably from 2 to 18, preferentially from 2 to 14 and more advantageously still from 2 to 6 carbon atoms;

[Chem 5]

•Formule(II-2): $CH_2=CR^V-C(=O)-O-R^{AC2}-O-[C(=O)-(CH_2)_r-O]_s-H$ (II-2)

in which:
r is an integer ranging from 1 to 10, preferably from 2 to 5, and preferentially r is equal to 5;
s is an integer ranging from 1 to 10, s preferably being equal to 2;
$R^V$ represents a hydrogen atom or a methyl radical;
$R^{AC2}$ represents a saturated or unsaturated, aliphatic or cyclic, linear or branched, divalent hydrocarbon radical comprising from 2 to 22 carbon atoms, preferably from 2 to 18, preferentially from 2 to 14 and more advantageously still from 2 to 6 carbon atoms;

[Chem 6]

•Formule(II-3): $CH_2=CR^V-C(=O)-O-[R^{AC3}-O]_t-H$ (II-3)

in which $R^V$ represents a hydrogen atom or a methyl radical, $R^{AC3}$ represents a linear or branched divalent hydrocarbon radical comprising from 2 to 4 carbon atoms and t is an integer ranging from 2 to 120, preferably from 1 to 10, t more preferentially still being equal to 2 or 3.

Mention may be made, among the hydroxylated esters of acrylic acid and methacrylic acid of formula (II-1), for example, of 2-hydroxyethyl acrylate (HEA), 2-hydroxypropyl acrylate (HPA), 2-hydroxybutyl acrylate (2-HBA) and 4-hydroxybutyl acrylate (4-HBA) available from Sartomer, Cognis or BASF, 2-hydroxyethyl methacrylate (HEMA) and 2-hydroxypropyl methacrylate (HPMA) available from Evonik, 2-hydroxybutyl methacrylate (2-HBMA) and 4-hydroxybutyl methacrylate (4-HBMA) available from Sigma-Aldrich.

Mention may be made, among the hydroxylated esters of acrylic acid and methacrylic acid of formula (II-2) above, for example, of polycaprolactone acrylate SR 495B (CAPA) available from Sartomer or hydroxyethylcaprolactone acrylate (HECLA) available from BASF.

Mention may be made, among the ethoxylated and/or propoxylated derivatives of acrylic acid and methacrylic acid of abovementioned formula (II-3), for example, of Blemmer® AP-150, Blemmer® AP-200, Blemmer® AP-400, Blemmer® AP-550, Blemmer® AP-800, Blemmer® AP-1000, Blemmer® AE-90, Blemmer® AE-150, Blemmer® AE-200, Blemmer® AE-350 or Blemmer® AE-400, sold by Nippon Oil & Fats Corporation, or SR 604 from Sartomer.

Preferably, the hydroxylated ester of (meth)acrylic acid has the abovementioned formula (II-1) and more preferentially one of the following formulae (II-1-1), (II-1-2), (II-1-3) or (II-1-4):

—$CH_2$—CH—C(=O)—O—
　　$CH_2$—$CH_2$—OH　　(II-1-1): 2-hydroxyethyl acrylate;

—$CH_2$=C(Me)-C(=O)—
　　O—$CH_2$—$CH_2$—OH　(II-1-2): 2-hydroxyethyl methacrylate;

—$CH_2$=CH—C(=O)—
　　O—$CH_2$—CH(Me)-OH　(II-1-3): 2-hydroxypropyl acrylate;

—$CH_2$=C(Me)-C(=O)—
　　O—$CH_2$—CH(Me)-OH　(II-1-4): 2-hydroxypropyl methacrylate.

In the context of the invention, and unless otherwise mentioned, the term "hydroxylated amide of (meth)acrylic acid" is understood to mean an acrylic acid or methacrylic acid amide, the amide radical of which is substituted by at least one hydroxyl group. A hydroxylated amide of (meth)acrylic acid can, for example, be represented by the following formula:

[Chem 7]

$$CH_2=CR^V-C(=O)-N(R^{'N})-R^N$$

in which $R^V$ represents a hydrogen atom or a methyl radical, $R^N$ represents an organic radical substituted by at least one hydroxyl group and $R^{'N}$ represents H or an alkyl radical comprising from 1 to 22 carbon atoms, preferably from 1 to 18, preferentially from 1 to 14 and more advantageously still from 1 to 6 carbon atoms.

According to one embodiment, the hydroxylated amide of (meth)acrylic acid has the following formula (II'):

[Chem 8]

$$CH_2=CR^V-C(=O)-N(R^{'N})-R^{AM}-OH \quad (II')$$

in which $R^V$ represents a hydrogen atom or a methyl radical, $R^{'N}$ is as defined above and $R^{AM}$ represents a saturated or unsaturated, aliphatic or cyclic, linear or branched, divalent hydrocarbon radical preferably comprising from 1 to 240 carbon atoms, and/or optionally interrupted by one or more heteroatoms (such as, for example, N, O or S, and in particular 0), and/or optionally interrupted by one or more divalent —N(R'''$^N$)— groups with R'''$^N$ being as defined above, and/or optionally substituted.

According to one embodiment, the hydroxylated amide of (meth)acrylic acid has one of the following formulae:

[Chem 9]

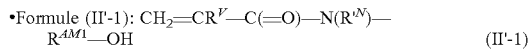

•Formule (II'-1): CH$_2$=CR$^V$—C(=O)—N(R'$^N$)—R$^{AM1}$—OH    (II'-1)

in which R$^V$ represents a hydrogen atom or a methyl radical, R'$^N$ is as defined above and R$^{AM1}$ represents a saturated or unsaturated, aliphatic or cyclic, linear or branched, divalent hydrocarbon radical comprising from 1 to 22 carbon atoms, preferably from 1 to 18, preferentially from 1 to 14 and more advantageously still from 1 to 6 carbon atoms;

[Chem 10]

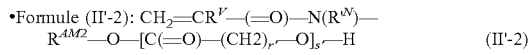

•Formule (II'-2): CH$_2$=CR$^V$—(=O)—N(R'$^N$)—R$^{AM2}$—O—[C(=O)—(CH2)$_r$—O]$_s$—H    (II'-2)

in which:
R'$^N$ is as defined above;
r' is an integer ranging from 1 to 10, preferably from 1 to 5, and preferentially r is equal to 5;
s' is an integer ranging from 1 to 10, s preferably being equal to 2;
R$^V$ represents a hydrogen atom or a methyl radical;
R$^{AM2}$ represents a saturated or unsaturated, aliphatic or cyclic, linear or branched, divalent hydrocarbon radical comprising from 2 to 22 carbon atoms, preferably from 2 to 18, preferentially from 2 to 14 and more advantageously still from 2 to 6 carbon atoms;

[Chem 11]

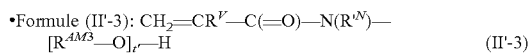

•Formule (II'-3): CH$_2$=CR$^V$—C(=O)—N(R'$^N$)—[R$^{AM3}$—O]$_{t'}$—H    (II'-3)

in which R$^V$ represents a hydrogen atom or a methyl radical, R'$^N$ is as defined above, R$^{AM3}$ represents a linear or branched divalent hydrocarbon radical comprising from 2 to 4 carbon atoms and t' is an integer ranging from 2 to 120, preferably from 1 to 10, t' preferably representing 2 or 3.

Preferably, the hydroxylated amide of (meth)acrylic acid has the abovementioned formula (II'-1), and in particular one of the following formulae (II'-1-1) to (II'-1-4):

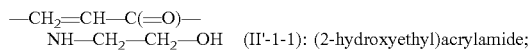
—CH$_2$=CH—C(=O)—
  NH—CH$_2$—CH$_2$—OH    (II'-1-1): (2-hydroxyethyl)acrylamide;

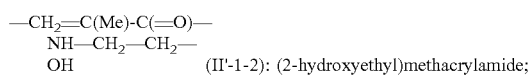
—CH$_2$=C(Me)-C(=O)—
  NH—CH$_2$—CH$_2$—
    OH    (II'-1-2): (2-hydroxyethyl)methacrylamide;

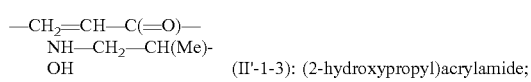
—CH$_2$=CH—C(=O)—
  NH—CH$_2$—CH(Me)-
    OH    (II'-1-3): (2-hydroxypropyl)acrylamide;

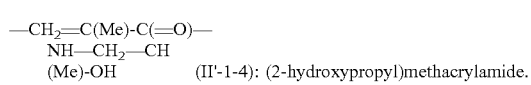
—CH$_2$=C(Me)-C(=O)—
  NH—CH$_2$—CH
    (Me)-OH    (II'-1-4): (2-hydroxypropyl)methacrylamide.

Preferably, the abovementioned polyurethane (a) comprising at least two end functional groups T of formula (I) is prepared by a process comprising the following stages:
E1) the preparation of a polyurethane comprising at least two NCO end functional groups (preferably at the ends of the main chain) by a polyaddition reaction:
  i) of at least one polyisocyanate, preferably chosen from diisocyanates, triisocyanates and their mixtures;
  ii) with at least one polyol, preferably chosen from polyether polyols, polyester polyols, polyene polyols, polycarbonate polyols, poly(ether-carbonate) polyols, polymers having —OH end groups, and their mixtures;
in amounts such that the NCO/OH molar ratio, denoted (r1), is strictly greater than 1, preferably ranges from 1.60 to 1.90 and preferentially ranges from 1.65 to 1.85;
and
  E2) the reaction of the product formed on conclusion of stage E1) with at least one hydroxylated ester of (meth)acrylic acid as defined above (preferably of abovementioned formula (II-1-1) or (II-1-2)) or at least one hydroxylated amide of (meth)acrylic acid as defined above (preferably of abovementioned formula (II'-1-1) or (II'-1-2) or (II'-1-3) or (II'-1-4)), in amounts such that the OH/NCO molar ratio, denoted (r2), is less than or equal to 1.00, preferably ranging from 0.75 to 1.00 and preferentially from 0.80 to 0.90.

Preferentially, stage E2) is carried out with at least one hydroxylated ester of (meth)acrylic acid as defined above, preferably of the abovementioned formula (II-1-1) or (II-1-2).

In the context of the invention, and unless otherwise mentioned, (r1) is the NCO/OH molar ratio corresponding to the molar ratio of the number of isocyanate (NCO) groups to the number of hydroxyl (OH) groups carried by all of the polyisocyanate(s) and polyol(s) present in the reaction medium of stage E1).

When the polyurethane carrying NCO end groups is obtained during stage E1) from a mixture of polyisocyanates or from several polyisocyanates added successively, the calculation of the ratio (r1) takes into account, on the one hand, the NCO groups carried by all of the polyisocyanate(s) present in the reaction medium of stage E1) and, on the other hand, the OH groups carried by the polyol(s) present in the reaction medium of stage E1).

In the context of the invention, and unless otherwise mentioned, (r2) is the OH/NCO molar ratio corresponding to the molar ratio of the number of hydroxyl (OH) groups to the number of isocyanate (NCO) groups carried respectively by all of the alcohol(s) and of the isocyanate(s) (as regards in particular the polyurethane having NCO end groups and optionally the polyisocyanate(s) which have not reacted on conclusion of stage E1)) present in the reaction medium of stage E2).

Stage E1)
Polyol(s)

The polyol(s) which can be used according to the invention can be chosen from those, the number-average molar mass (Mn) of which ranges from 2,000 to 12,000 g/mol, preferably from 3,000 to 11,000 g/mol and more preferentially from 4,000 to 10,000 g/mol.

Preferably, their hydroxyl functionality ranges from 2 to 3, preferentially is 2.

The polyol(s) which can be used according to the invention can exhibit a (mean) hydroxyl number (OHN) ranging from 9 to 85 milligrams of KOH per gram of polyol (mg KOH/g), preferably from 10 to 56 mg KOH/g, preferentially from 11 to 42 mg KOH/g.

According to one embodiment, the hydroxyl number of polyol(s) exhibiting a hydroxyl functionality of 2 ranges from 9 to 56 mg KOH/g, preferably from 10 to 37 mg KOH/g and more preferentially from 11 to 37 mg KOH/g.

According to one embodiment, the hydroxyl number of polyol(s) exhibiting a hydroxyl functionality of 3 ranges from 14 to 84 mg KOH/g, preferably from 15 to 56 mg KOH/g and more preferentially from 17 to 42 mg KOH/g.

The polyol(s) which can be used can be chosen from polyether polyols, polyester polyols, unsaturated or hydrogenated polyene polyols, polycarbonate polyols, poly(ether-carbonate) polyols, polymers having —OH end groups and their mixtures.

The polyol(s) which can be used can be chosen from aromatic polyols, aliphatic polyols, arylaliphatic polyols and the mixtures of these compounds.

The polyol(s) which can be used according to the invention is (are) preferably chosen from polyether polyols, polyester polyols and their mixtures.

More preferentially, the polyether polyol(s) which can be used according to the invention is (are) preferably chosen from polyoxyalkylene diols or polyoxyalkylene triols, the linear or branched alkylene part of which comprises from 1 to 4 carbon atoms, more preferentially from 2 to 3 carbon atoms.

Preferentially, the polyester polyol(s) which can be used according to the invention is (are) preferably chosen from polyester diols or polyester triols.

Mention may be made, as examples of polyoxyalkylene polyols which can be used according to the invention, of polyoxypropylene diols or triols (also denoted by polypropylene glycol (PPG) diols or triols) having a number-average molecular weight (Mn) ranging from 2,000 to 12,000 g/mol and their mixtures.

The abovementioned polyether polyols can be prepared conventionally and are widely available commercially. They can be obtained by polymerization of the corresponding alkylene oxide in the presence of a basic catalyst (for example potassium hydroxide) or of a catalyst based on a double metal/cyanide complex.

Mention may be made, as example of polyether diol, of the polyoxypropylene diol sold under the name Acclaim® by Bayer, such as Acclaim® 12200, with a number-average molar mass in the vicinity of 11,335 g/mol and the hydroxyl number of which ranges from 9 to 11 mg KOH/g, Acclaim® 8200, with a number-average molar mass in the vicinity of 8,057 g/mol and the hydroxyl number of which ranges from 13 to 15 mg KOH/g, and Acclaim® 4200, with a number-average molar mass in the vicinity of 4020 g/mol and the hydroxyl number of which ranges from 26.5 to 29.5 mg KOH/g, which are obtained, in a known way, by polymerization of the corresponding alkylene oxide in the presence of a catalyst based on a double metal/cyanide complex.

Mention may be made, as example of polyether triol, of the polyoxypropylene triol sold under the name Voranol® CP3355 by Dow, the hydroxyl number of which is 48 mg KOH/g.

According to the invention, the polyester polyol(s) can have a number-average molecular weight (Mn) ranging from 2000 to 12 000 g/mol, preferably from 3000 to 11 000 g/mol and more preferentially from 4000 to 10 000 g/mol.

Mention may be made, as example of polyester diols or triols, of the polyester polyols of natural origin derived from castor oil and also the polyester polyols resulting from the polycondensation:
of one or more aliphatic (linear, branched or cyclic) or aromatic polyols, such as, for example, monoethylene glycol, diethylene glycol, 1,2-propanediol, 1,3-propanediol, 1,4-butanediol, butenediol, 1,6-hexanediol, cyclohexanedimethanol, tricyclodecanedimethanol, neopentyl glycol, cyclohexanedimethanol, glycerol, trimethylolpropane, 1,2,6-hexanetriol, sucrose, glucose, sorbitol, pentaerythritol, mannitol, N-methyldiethanolamine, triethanolamine, a fatty alcohol dimer, a fatty alcohol trimer and their mixtures, with
one or more polycarboxylic acids or an ester or anhydride derivative thereof, such as 1,6-hexanedioic acid (adipic acid), dodecanedioic acid, azelaic acid, sebacic acid, adipic acid, 1,18-octadecanedioic acid, phthalic acid, isophthalic acid, terephthalic acid, succinic acid, a fatty acid dimer, a fatty acid trimer and the mixtures of these acids, an unsaturated anhydride, such as, for example, maleic or phthalic anhydride, or a lactone, such as, for example, caprolactone;

The abovementioned polyester polyols can be prepared conventionally and are for the most part commercially available.

Mention may be made, as example of polyester polyols, for example, of the following products with a hydroxyl functionality equal to 2:
estolide polyols resulting from the polycondensation of one or more hydroxy acids, such as ricinoleic acid, with a diol (mention may be made, for example, of Polycin® D-2000 with a number-average molecular weight (Mn) of approximately, 2000 g/mol, Polycin® D-3000 with a number-average molecular weight (Mn) of approximately 3,000 g/mol and Polycin® D-4,000 with a number-average molecular weight (Mn) of approximately 4,000 g/mol, which are available from Vertellus), Tone® 0240 (sold by Union Carbide), which is a polycaprolactone with a number-average molecular weight (Mn) of approximately 2,000 g/mol and a melting point of approximately 50° C., Dynacoll® 7381 (sold by Evonik) with a number-average molecular weight (Mn) of approximately 3,500 g/mol and having a melting point of approximately 65° C., Dynacoll® 7360 (sold by Evonik), which results from the condensation of adipic acid with hexanediol and has a number-average molecular weight (Mn) of approximately 3,500 g/mol and a melting point of approximately 55° C., Dynacoll® 7330 (sold by Evonik) with a number-average molecular weight (Mn) of approximately 3,500 g/mol and having a melting point of approximately 85° C., Dynacoll® 7363 (sold by Evonik), which also results from the condensation of adipic acid with hexanediol and has a number-average molecular weight (Mn) of approximately 5,500 g/mol and a melting point of approximately 57° C., Dynacoll® 7250 (sold by Evonik): polyester polyol having a viscosity of 180 Pa·s at 23° C., a number-average molecular weight (Mn) equal to 5,500 g/mol and a Tg equal to −50° C., Kuraray® P-6010 (sold by Kuraray): polyester polyol having a viscosity of 68 Pa·s at 23° C., a number-average molecular weight (Mn) equal to 6,000 g/mol and a Tg equal to −64° C., Kuraray® P-10010 (sold by Kuraray): polyester polyol having a viscosity of 687 Pa·s at 23° C. and a number-average molecular weight (Mn) equal to 10,000 g/mol.

According to the invention, the polyene polyol(s), and also their corresponding hydrogenated or epoxidized derivatives, can have a number-average molecular weight (Mn) ranging from 2,000 to 12,000 g/mol, preferably from 3,000 to 11,000 g/mol and more preferentially from 4,000 to 10,000 g/mol.

Preferably, the polyene polyol(s) which can be used according to the invention is (are) chosen from butadiene and/or isoprene homopolymers and copolymers comprising hydroxyl end groups, which are optionally hydrogenated or epoxidized.

In the context of the invention, and unless otherwise mentioned, the term "hydroxyl end groups" of a polyene polyol is understood to mean the hydroxyl groups located at the ends of the main chain of the polyene polyol.

The abovementioned hydrogenated derivatives can be obtained by complete or partial hydrogenation of the double bonds of a polydiene comprising hydroxyl end groups, and are thus saturated or unsaturated.

The abovementioned epoxidized derivatives can be obtained by chemoselective epoxidation of the double bonds of the main chain of a polyene comprising hydroxyl end groups, and thus comprise at least one epoxy group in their main chain.

Mention may be made, as examples of polyene polyols, of saturated or unsaturated butadiene and/or isoprene homopolymers and copolymers comprising hydroxyl end groups, which are optionally epoxidized, such as, for example, those sold under the name Poly BD® or Krasol® by Cray Valley.

Mention may be made, as examples of polyene polyols, of:
saturated or unsaturated butadiene homopolymer diols comprising hydroxyl end groups, such as those sold under the name Poly BD® R45HT (Mn=2,800 g/mol) or Krasol® (Mn=2,400 to 3,100 g/mol) by Cray Valley,
saturated or unsaturated isoprene homopolymer diols comprising hydroxyl end groups, such as, for example, those sold under the name Poly IP™ (unsaturated, Mn=2,000 g/mol) or Epol™ (saturated, Mn=2,600 g/mol) by Idemitsu Kosan.

According to the invention, the polycarbonate polyol(s) can have a number-average molecular weight (Mn) ranging from 2,000 to 12,000 g/mol, preferably from 3,000 to 11,000 g/mol and more preferentially from 4,000 to 10,000 g/mol.

Mention may be made, as example of polycarbonate diols, of:
Converge® Polyol 212-20 sold by Novomer, with a number-average molecular weight (Mn) equal to 2000 g/mol, the hydroxyl number of which is respectively 56 mg KOH/g,
Polyol C-2090 and C-3090, sold by Kuraray, with a number-average molecular weight (Mn) respectively of 2,000 and 3,000 g/mol and with a hydroxyl number of 56 and 37 mg KOH/g.

The hydroxyl number here represents the number of hydroxyl functional groups per gram of polyol and is expressed in the text of the present patent application in the form of the equivalent number of milligrams of potassium hydroxide (KOH) which are used in the quantitative determination of the hydroxyl functional groups.

According to the invention, the polymers having —OH end groups can be obtained by polyaddition reaction between one or more polyol(s) and one or more polyisocyanate(s), in amounts of polyisocyanate(s) and of polyol(s) resulting in an NCO/OH molar ratio strictly of greater than 1. The reaction can be carried out in the presence of a catalyst. The polyols and polyisocyanates which can be used can be those typically used in the preparation of polyurethanes having —NCO end groups and preferably those described in the present patent application.

Preferably, the polyols are polyether polyols.

According to a preferred embodiment, stage E1) is carried out in the presence of a diol having a number-average molecular weight (Mn) of greater than or equal to 4,000 g/mol, or in the presence of a mixture of polyols comprising one or more diol(s), the number-average molecular weight (Mn) of which is greater than or equal to 4,000 g/mol. More preferably still, all the diols used necessarily have a number-average molecular weight (Mn) of greater than or equal to 4,000 g/mol.

According to a preferred embodiment, stage E1) is carried out:
with a single diol with a number-average molecular weight (Mn) of greater than or equal to 4,000 g/mol; or
with a mixture of a diol with a number-average molecular weight (Mn) of greater than or equal to 4,000 g/mol and of a triol advantageously having a number-average molecular weight (Mn) of greater than or equal to 2,000 g/mol.

Polyisocyanate(s)

The polyisocyanate(s) which can be used according to the invention in stage E1) can be added sequentially or reacted in the form of a mixture.

According to one embodiment, the polyisocyanate(s) which can be used are diisocyanate(s), preferably chosen from the group consisting of isophorone diisocyanate (IPDI), hexamethylene diisocyanate (HDI), heptane diisocyanate, octane diisocyanate, nonane diisocyanate, decane diisocyanate, undecane diisocyanate, dodecane diisocyanate, 4,4'-methylenebis(cyclohexyl isocyanate) (4,4'-HMDI), norbornane diisocyanate, norbornene diisocyanate, 1,4-cyclohexane diisocyanate (CHDI), methylcyclohexane diisocyanate, ethylcyclohexane diisocyanate, propylcyclohexane diisocyanate, methyldiethylcyclohexane diisocyanate, cyclohexanedimethylene diisocyanate, 1,5-diisocyanato-2-methylpentane (MPDI), 1,6-diisocyanato-2,4,4-trimethylhexane, 1,6-diisocyanato-2,2,4-trimethylhexane (TMDI), 4-isocyanatomethyl-1,8-octane diisocyanate (TIN), 2,5-bis(isocyanatomethyl)bicyclo[2.2.1]heptane (2,5-NBDI), 2,6-bis(isocyanatomethyl)bicyclo[2.2.1]heptane (2,6-NBDI), 1,3-bis(isocyanatomethyl)cyclohexane (1,3-H6-XDI), 1,4-bis(isocyanatomethyl)cyclohexane (1,4-H6-XDI), xylylene diisocyanate (XDI) (especially m-xylylene diisocyanate (m-XDI)), toluene diisocyanate (especially 2,4-toluene diisocyanate (2,4-TDI) and/or 2,6-toluene diisocyanate (2,6-TDI)), diphenylmethane diisocyanate (especially 4,4'-diphenylmethane diisocyanate (4,4'-MDI) and/or 2,4'-diphenylmethane diisocyanate (2,4'-MDI)), tetramethylxylylene diisocyanate (TMXDI) (especially tetramethyl-meta-xylylene diisocyanate), an HDI allophanate, for example having the following formula (Y):

[Chem 12]

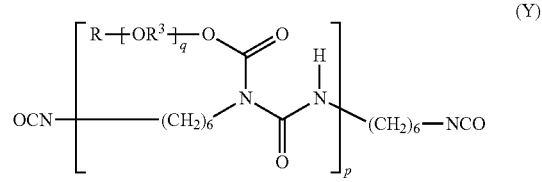

in which p is an integer ranging from 1 to 2, q is an integer ranging from 0 to 9 and preferably 2 to 5, R represents a saturated or unsaturated, cyclic or acyclic, linear or branched, hydrocarbon chain comprising from 1 to 20 carbon atoms, preferably from 1 to 12 carbon atoms, 6 to 14 carbon atoms, and $R^3$ represents a linear or branched divalent alkylene group having from 2 to 4 carbon atoms and preferably a divalent propylene group;
and their mixtures.

Preferably, the allophanate of abovementioned formula (Y) is such that p, q, R and $R^3$ are chosen such that the above HDI allophanate derivative comprises a content of isocyanate NCO groups ranging from 12% to 14% by weight, with respect to the weight of the said derivative.

The polyisocyanates which can be used to prepare the polyurethane used according to the invention are widely available commercially. Mention may be made, by way of example, of Scuranate® TX sold by Vencorex, corresponding to a 2,4-TDI with a purity of the order of 95%, Scuranate® T100 sold by Vencorex, corresponding to a 2,4-TDI with a purity of 99% by weight, Desmodur® I sold by Covestro, corresponding to an IPDI, Takenate™ 500 sold by Mitsui Chemicals, corresponding to an m-XDI, Takenate™ 600 sold by Mitsui Chemicals, corresponding to an m-H6XDI, Vestanat® H12MDI sold by Evonik, corresponding to an H12MDI, or also those of the Tolonate® series sold by Vencorex, such as Tolonate® X FLO 100, corresponding to an HDI allophanate derivative of formula (Y).

According to a preferred embodiment, the polyisocyanate(s) of stage E1) is(are) chosen from the group consisting of toluene diisocyanate (especially the 2,4-TDI isomer, the 2,6-TDI isomer or their mixtures), meta-xylylene diisocyanate (m-XDI), isophorone diisocyanate, HDI allophanates and their mixtures.

Reaction Conditions

The reaction between the said polyisocyanate(s) and the said polyol(s) can be carried out at a reaction temperature T1 of less than 95° C. and preferably ranging from 65° C. to 80° C.

The polyaddition reaction of stage E1) can be carried out in the presence or absence of at least one reaction catalyst.

The reaction catalyst(s) which can be used during the polyaddition reaction of stage E1) can be any catalyst known to a person skilled in the art for catalysing the formation of polyurethane by reaction of at least one polyisocyanate with at least one polyol. An amount ranging up to 0.3% by weight of catalyst(s), with respect to the weight of the reaction medium of stage E1), can be used. In particular, it is preferable to use from 0.02% to 0.2% by weight of catalyst(s), with respect to the total weight of the reaction medium of stage E1).

The polyurethane obtained on conclusion of the above-mentioned stage E1) can have the following formula (III):

[Chem 13]

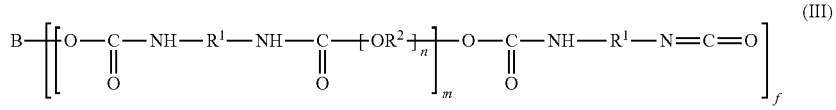

in which:
B represents one of the two formulae below:

[Chem 14]

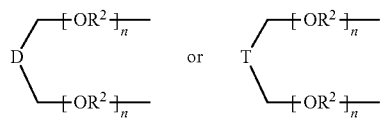

D and T represent a saturated or unsaturated, aliphatic or cyclic, linear or branched, hydrocarbon radical comprising from 2 to 66 carbon atoms, optionally comprising one or more heteroatoms;

$R^1$ represents a divalent group resulting from the polyisocyanate(s);

$R^2$ represents a divalent group resulting from the polyol(s);

n is a non-zero integer such that the number-average molar mass (Mn) of the polyol block(s) of formula —[$OR^2$]$_n$— ranges from 2,000 to 12,000 g/mol, preferably from 3,000 to 11,000 g/mol and more preferentially from 4,000 to 10,000 g/mol;

f represents the mean functionality of the —NCO-terminated polyurethane, which is an integer or non-integer which can range from 2.0 to 2.2;

f, n and m are integers such that the NCO percentage of the polyurethane ranges from 0.4% to 3% and preferentially from 0.6% to 1.7%, with respect to the total weight of the said polyurethane.

In particular, $R^1$ represents a divalent group chosen from one of the following aliphatic or aromatic divalent groups:

the divalent group derived from isophorone diisocyanate (IPDI):

[Chem 15]

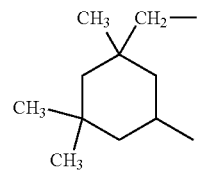

the divalent group derived from 2,4-toluene diisocyanate (2,4-TDI):

[Chem 16]

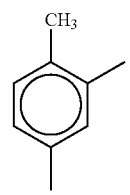

the divalent group derived from m-xylylene diisocyanate (m-XDI):

[Chem 17]

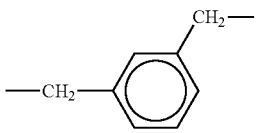

the divalent group derived from 4,4'-diphenylmethane diisocyanate (4,4'-MDI) and 2,4'-diphenylmethane diisocyanate (2,4'-MDI):

[Chem 18]

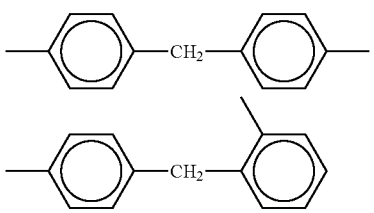

the divalent group derived from a hexamethylene diisocyanate (HDI) allophanate of following formula:

[Chem 19]

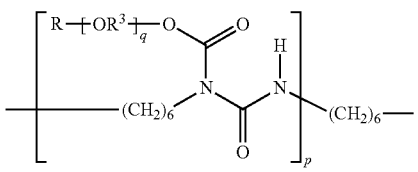

in which:
p is an integer ranging from 1 to 2;
q is an integer ranging from 2 to 5;
R represents a saturated or unsaturated, cyclic or aliphatic, linear or branched, hydrocarbon chain comprising from 6 to 14 carbon atoms;
$R^3$ represents a divalent propylene group;
p, q, R and $R^3$ are chosen such that the corresponding HDI allophanate derivative of formula (I) comprises a content of isocyanate NCO group ranging from 12% to 14% by weight.

The polyurethane obtained in stage E1) preferably has a viscosity ranging from 10,000 to 100,000 mPa·s (millipascal·second) at 23° C. and more preferentially a viscosity of less than 50,000 mPa·s.

According to a preferred embodiment, the polyurethane comprising at least two NCO end functional groups is obtained by polyaddition reaction E1):
i) of at least one diisocyanate chosen from the group consisting of toluene diisocyanate, meta-xylylene diisocyanate, isophorone diisocyanate, HDI allophanates and their mixtures;
ii) with at least one polyether diol having a number-average molecular weight (Mn) of greater than or equal to 4,000 g/mol, or with a mixture of polyether diol having a number-average molecular weight (Mn) of greater than or equal to 4,000 g/mol with a polyether triol advantageously having a number-average molecular weight (Mn) of greater than or equal to 2,000 g/mol.

Stage E2)

The reaction of stage E2) can be carried out at a reaction temperature T2 of less than 95° C. and preferably ranging from 65° C. to 80° C., preferably under anhydrous conditions.

The hydroxylated esters of (meth)acrylic acids of abovementioned formula (II), preferably of abovementioned formula (II-1) or (II-2) or (II-3), can be employed either pure or in the form of a mixture of different hydroxylated esters of (meth)acrylic acid having a mean hydroxyl number of the said mixture ranging from 56 to 483 mg KOH/g of the said mixture.

The hydroxylated amides of (meth)acrylic acids of abovementioned formula (II'), preferably of formula (II'-1) or (II'-2) or (II'-3), can be employed either pure or in the form of a mixture of different hydroxylated amides of (meth)acrylic acid having a mean hydroxyl number of the said mixture ranging from 56 to 487 mg KOH/g of the said mixture.

Stage E2) is preferably carried out with at least one hydroxylated ester of acrylic acid or methacrylic acid of abovementioned formula (II), preferably of abovementioned formula (II-1) or (II-2) or (II-3), and in particular of abovementioned formula (II-1-1), (II-1-2), (II-1-3) or (II-1-4), advantageously of abovementioned formula (II-1-1) or (II-1-2).

The reaction catalyst(s) which can be used for stages E1) and E2) can be any catalyst known to a person skilled in the art for catalysing the formation of polyurethane by reaction of at least one diisocyanate, of at least one polyol and of at least one hydroxyalkyl (meth)acrylate or one hydroxyalkyl (meth)acrylamide.

Preferably, use is made of one or more catalysts chosen from catalysts not exhibiting or exhibiting very little risk of toxicity. In particular, the reaction catalyst(s) are chosen from the group consisting:

of organometallic derivatives of bismuth, such as bismuth neodecanoate, sold under the name Borchi Kat® 315 by OM Group, or bismuth carboxylate, sold under the name K-Kat® XC B221 by King Industries, of organometallic derivatives of tin other than dibutyltin dilaurate, such as, for example, dioctyltin dilaurate (DOTL), such as sold under the name Tib® Kat 217 by TIB Chemicals, of organometallic derivatives of zinc, such as zinc carboxylate, sold under the name Borchi Kat® 22 by OM Group, of organometallic derivatives of titanium, such as titanium tetrabutylate $Ti(OCH_2CH_2CH_2CH_3)_4$ or titanium ethyl acetoacetate, sold under the name Tyzor® Pita by DuPont, of organometallic derivatives of zirconium, such as the zirconium chelate sold under the name K-Kat® A209, zirconium acetylacetonate ($Zr(acac)_4$) and zirconium tetraethanolate $Zr(OCH_2CH_3)_4$, and of their mixtures.

An amount ranging up to 0.3% by weight of catalyst(s), with respect to the total weight of the reaction medium of stage E2), can be used. In particular, it is preferable to use from 0.02% to 0.3% by weight of catalyst(s), with respect to the total weight of the reaction medium of stage E2).

According to a preferred embodiment, the abovementioned polyurethane (a) is obtained by a process comprising the following stages:

E1) the preparation of a polyurethane comprising at least two NCO end functional groups by polyaddition reaction:
i) of at least one diisocyanate chosen from the group consisting of toluene diisocyanate, meta-xylylene diisocyanate, isophorone diisocyanate, HDI allophanates and their mixtures;
ii) with at least one polyether diol having a number-average molecular weight (Mn) of greater than or equal to 4,000 g/mol, or with a mixture of polyether diol having a number-average molecular weight (Mn) of greater than or equal to 4,000 g/mol with a polyether triol advantageously having a number-average molecular weight (Mn) of greater than or equal to 2,000 g/mol;

E2) the reaction of the product formed on conclusion of stage E1) with at least one hydroxylated ester of acrylic acid of formula (II-1-1), in amounts such that the OH/NCO molar ratio (denoted r2) is less than or equal to 1.00.

Tackifying Resin (b)

The tackifying resin(s) which can be used according to the invention can have a softening temperature ranging from 70° C. to 150° C., preferably ranging from 75° C. to 130° C.

The softening temperature (or point) of the resin can be determined in accordance with the standardized test ASTM E 28-18, the principle of which is as follows: a brass ring with a diameter of approximately 2 cm is filled with the test resin in the molten state. After cooling to ambient temperature, the ring and the solid resin are placed horizontally in a thermostatically controlled bath of glycerol, the temperature of which can vary by 5° C. per minute. A steel ball with a diameter of approximately 9.5 mm is centred on the disc of solid resin. The softening temperature is, during the phase of rise in temperature of the bath at a rate of 5° C. per minute, the temperature at which the disc of resin yields by a height of 25.4 mm under the weight of the ball.

The adhesive composition can comprise from 33% to 60%, preferentially from 35% to 55%, by weight of tackifying resin(s) (b), with respect to the total weight of the composition.

Tackifying Resin (b1)

The tackifying resin can be a resin (b1) chosen from terpene/phenolic resins.

Terpene/phenolic resins include resins comprising a terpene residue and a phenol residue.

Terpene/phenolic resins cover in particular:
copolymers of terpene and of phenol compound (terpene/phenol copolymer resins), and
a terpene, its homopolymers or copolymers, modified by a phenol (phenol-modified terpene resins).

Preferably, the terpene/phenolic resins are phenol-modified terpene resins obtained by polymerization of terpene hydrocarbons (such as, for example, the monoterpene) in the presence of at least one Friedel-Crafts catalyst, followed by a reaction with at least one phenol.

The tackifying resin(s) (b1) can exhibit a softening temperature ranging from 100° C. to 125° C., preferably from 110° C. to 125° C. and more preferentially from 115° C. to 120° C.

The tackifying resin(s) (b1) can exhibit a number-average molar mass Mn ranging from 470 to 700 Da, preferably from 500 to 650 Da.

The tackifying resin(s) (b1) can have a hydroxyl number ranging from 40 to 160 mg KOH/g, preferably ranging from 50 to 155 mg KOH/g and more preferentially ranging from 90 to 150 mg KOH/g.

Mention may be made, among the terpene/phenolic resins (b1), for example, of Dertophene® H150 available from DRT having a molar mass equal to approximately 630 Da, having a softening temperature of 118° C. and having a hydroxyl number ranging from 135 to 150 mg KOH/g.

Tackifying Resin (b2)

The tackifying resin(s) (b2) are resins resulting from the polymerization of α-methylstyrene, optionally followed by a reaction with at least one phenol.

The tackifying resin(s) (b2) can have a softening temperature ranging from 75° C. to 120° C., more preferentially from 90° C. to 110° C.

The tackifying resin(s) (b2) can have a number-average molar mass ranging from 650 to 1800 Da, preferably ranging from 750 to 1,050 Da, more preferentially ranging from 950 to 1,020 Da.

The tackifying resin(s) (b2) can have a hydroxyl number ranging from 4 to 50 mg KOH/g.

The tackifying resin(s) (b2) can have a polydispersity index ranging from 1.2 to 1.8, preferably ranging from 1.4 to 1.7.

Mention may be made, among the terpene/phenolic resins (b2), for example, of Sylvares® 520 AMS, available from Kraton (having a number-average molecular weight (Mn) of 940 Da, a softening temperature of 75° C. and a hydroxyl number of 39 mg KOH/g approximately); Sylvares® 525 AMS, also available from Kraton (having a number-average molecular weight (Mn) of approximately 1,770 Da, a softening temperature of 94° C. and a hydroxyl number of 4 mg KOH/g approximately); and Sylvares® 540 AMS, available from Kraton (having a number-average molar mass (Mn) of approximately 880 Da, a softening temperature of 76° C. and a hydroxyl number of 56 mg KOH/g approximately).

Tackifying Resin (b3)

The tackifying resin(s) (b3) are polymeric resins (optionally at least partially hydrogenated) resulting from mainly $C_9$ aromatic fractions.

The tackifying resin(s) (b3) is (are) obtained in particular by polymerization of mixtures of aromatic hydrocarbons having mainly 9 carbon atoms resulting from petroleum fractions.

The tackifying resin(s) (b3) can have a softening temperature ranging from 70° C. to 110° C., more preferentially from 80° C. to 110° C.

The tackifying resin(s) (b3) can have a number-average molar mass ranging from 400 to 1050 Da, preferably ranging from 450 to 850 Da, more preferentially ranging from 500 to 650 Da.

The tackifying resin(s) (b3) can have a polydispersity index ranging from 1.2 to 1.6, preferably ranging from 1.3 to 1.5.

Mention may be made, among the terpene/phenolic resins (b3), for example, of Picco® AR-85, available from Eastman (having a number-average molecular weight (Mn) of 520 Da, a softening point of 85° C. and a zero hydroxyl number); and Picco® AR-100, also available from Eastman (having a number-average molecular weight (Mn) of 600 Da, a softening point of 100° C. and a zero hydroxyl number).

Preferably, the composition does not comprise rosins of natural origin or modified rosins, such as, for example, the rosin extracted from pine gum, wood rosin extracted from tree roots and their derivatives which are hydrogenated, dimerized, polymerized or esterified with monoalcohols or polyols (such as, for example, glycerol).

More preferably still, the composition does not comprise other tackifying resins than the abovementioned tackifying resins b1, b2 and b3.

Preferably, the composition comprises at least one tackifying resin (b1).

Polymerization Inhibitor (c)

The composition according to the invention can comprise at least one polymerization inhibitor (c) in a content by weight of less than or equal to 3% by weight, with respect to the total weight of the composition, preferably in a content by weight ranging from 0.005% to 2% by weight, with respect to the total weight of the composition.

The polymerization inhibitor (c) is typically an antioxidant which makes it possible in particular to protect the composition from degradation resulting from a reaction with oxygen which is liable to be formed by the action of heat, light or residual catalysts on certain starting materials, such as the tackifying resins. The polymerization inhibitors are introduced in order to stabilize the composition and to prevent an uncontrolled polymerization of the (meth)acrylate functional groups during the manufacture, and in the packagings during storage, and in order to regulate the polymerization during the use of the composition.

The radical polymerization inhibitors (c) are preferably chosen from the group consisting of sterically hindered primary phenolic compounds (in particular substituted by methyl and/or tert-butyl groups), of phosphites, of hydroquinines, of phenols, of amines, of phenolamines, of phenothiazines and of their mixtures.

Mention may be made, among the sterically hindered primary phenolic compounds, for example, of Irganox® 1076 from BASF (octadecyl 3-(3,5-di(tert-butyl)-4-hydroxyphenyl)propionate), Irganox® 1010 from BASF (pentaerythritol tetrakis(3-(3,5-di(tert-butyl)-4-hydroxyphenyl) propionate) or Irganox® 245 from BASF (ethylenebis (oxyethylene) bis(3-(5-(tert-butyl)-4-hydroxy-m-tolyl) propionate).

Mention may be made, among the phosphites, for example, of Irgafos® 168, sold by BASF (tris(2,4-di(tert-butyl)phenyl) phosphite).

Radical Photoinitiator(s) (d)

The composition according to the invention can be polymerized or crosslinked under ultraviolet (UV) radiation or under radiation of an electron beam (e-beam).

According to one embodiment, when the composition is polymerized or crosslinked under UV radiation, it comprises at least one radical photoinitiator (d).

According to another embodiment, the compositions according to the invention do not comprise any radical photoinitiator when they are crosslinked with electron beam (e-beam) energy.

The composition according to the invention can comprise from 0% to 5% by weight, preferably from 0% to 3% by weight, more preferentially still from 0.1% to 2% by weight and more advantageously still from 0.5% to 1.5% by weight of radical photoinitiator(s), with respect to the total weight of the composition.

The radical photoinitiator (d) can be any radical photoinitiator known to a person skilled in the art. Under the action of UV/visible radiation, the radical photoinitiator generates radicals which will be responsible for the initiation of the photopolymerization reaction, and makes it possible in particular to increase the efficiency of the photopolymerization reaction. It is, of course, chosen as a function of the light source used, according to its ability to efficiently absorb the radiation selected. It will be possible, for example, to choose the appropriate radical photoinitiator from its UV/visible absorption spectrum. Advantageously, the radical photoinitiator is appropriate for working with irradiation sources emitting in the near zone of the visible region. Advantageously, the source of the UV or visible radiation can be an LED or a discharge lamp. For example, it can be an Hg/Xe lamp. Natural light can also be used.

Preferably, the said at least one radical photoinitiator (d) is chosen from the group consisting:
of radical photoinitiators of type I chosen from:
the family of the acetophenones and alkoxyacetophenones, such as, for example, 2,2-dimethoxy-2-phenylacetophenone and 2-diethyl-2-phenylacetophenone;
the family of the hydroxyacetophenones, such as, for example, 2,2-dimethyl-2-hydroxyacetophenone, 1-hydroxycyclohexyl phenyl ketone, 2-hydroxy-4'-(2-hydroxyethoxy)-2-methylpropiophenone and 2-hydroxy-4'-(2-hydroxypropoxy)-2-methylpropiophenone;
the family of the alkylaminoacetophenones, such as, for example, 2-methyl-4'-(methylthio)-2-morpholinopropiophenone, 2-benzyl-2-(dimethylamino)-4-morpholinobutyrophenone and 2-(4-methylbenzyl)-2-(dimethylamino)-4-morpholinobutyrophenone;
the family of the benzoin ethers, such as, for example, benzoin methyl ether and benzoin isopropyl ether;
the family of the phosphine oxides, such as, for example, diphenyl(2,4,6-trimethylbenzoyl)phosphine oxide (TPO), ethyl(2,4,6-trimethylbenzoyl) phenylphosphine oxide (TPO-L) and bis(2,6-dimethoxybenzoyl)(2,4,4-trimethylphenyl) phosphineoxide(BAPO);
of radical photoinitiators of type II chosen from:
the family of the benzophenones, such as, for example, 4-phenylbenzophenone, 4-(4'-methylphenylthio) benzophenone or 1-[4-[(4-benzoylphenyl)thio]phenyl]-2-methyl-2-[(4-methylphenyl)sulfonyl]-1-propanone;
the family of the thioxanthones, such as, for example, isopropylthioxanthone (ITX), 2,4-diethylthioxanthone, 2,4-dimethylthioxanthone, 2-chlorothioxanthone and 1-chloro-4-isopropylthioxanthone;
the family of the quinones, such as, for example, anthraquinones, including 2-ethylanthraquinone, and camphorquinones;
the family of the benzoylformate esters, such as, for example, methyl benzoylformate;
the family of the metallocenes, such as, for example, ferrocene, bis(eta5-2,4-cyclopentadien-1-yl)bis(2,6-difluoro-3-(1H-pyrrol-1-yl)phenyl)titanium and (cumene)(cyclopentadienyl)iron hexafluorophosphate;
the family of the dibenzylidene ketones, such as, for example, the p-dimethylaminoketone;
the family of the coumarins, such as, for example, 5-methoxy- and 7-methoxycoumarin, 7-diethylaminocoumarin and N-phenylglycine coumarin;
of radical photoinitiators of the family of the dyes, such as, for example, triazines, fluorones, cyanines, safranins, 4,5,6,7-tetrachloro-3',6'-dihydroxy-2',4',5',7'-tetraiodo-3H-spiro[isobenzofuran-1,9'-xanthen]-3-one, pyryliums and thiopyryliums, thiazines, flavins, pyronines, oxazines or rhodamines;
and of their mixtures.

More preferably still, the radical photoinitiator (d) is chosen from the abovementioned radical photoinitiators of type I.

For example, when the source of the UV or visible radiation is an LED, the radical photoinitiator can be chosen from 2,4,6-trimethylbenzoyldiphenylphosphine oxide or TPO available, for example, from Lambson under the commercial reference Speedcure® TPO (CAS: 75980-60-8), ethyl (2,4,6-trimethylbenzoyl)phenylphosphinate or TPO-L available, for example, from Lambson under the commercial reference Speedcure® TPO-L (CAS: 84434-11-7), phenyl-bis(2,4,6-trimethylbenzoyl)phosphine oxide or BAPO (CAS: 162881-26-7) available, for example, from BASF under the commercial reference Irgacure® 819, 2-benzyl-2-dimethylamino-1-(4-morpholinophenyl)-1-butanone (CAS: 119313-12-1) available, for example, from BASF under the commercial reference Irgacure® 369, 2-methyl-1-[4-(methylthio)phenyl]-2-(4-morpholinyl)-1-propanone (CAS: 71868-10-5) available, for example, from BASF under the commercial reference Irgacure® 907, 1-hydroxy-cyclohexyl phenyl ketone (CAS: 947-19-3) available, for example, from BASF under the commercial reference Irgacure® 184, 2-isopropylthioxanthone or ITX (CAS: 5495-84-1) available, for example, under the reference Speedcure® 2-ITX, or their mixtures.

The radical photoinitiators (d) according to the invention are preferentially liquids.

Additive(s) (e)

The composition according to the invention can also include one or more additive(s) (e) appropriately chosen in order not to damage the properties of the crosslinked adhesive. Mention may be made, for example, of adhesion promoters, rheological agents, thixotropic agents, plasticizers, opacifying agents, pigments, dyes, fillers and their mixtures. These additives can be chosen from those generally used in adhesive compositions.

Preferably, the composition according to the invention does not comprise plasticizer.

Adhesive Composition

Preferably, the composition according to the invention does not comprise organic solvent with a boiling point of less than 250° C. at atmospheric pressure, such as ethyl acetate, xylene, toluene or N-methyl-2-pyrrolidone (NMP).

Preferably, in the adhesive composition, the polyurethane(s) (a): tackifying resin(s) (b) ratio by weight ranges from 45:55 to 55:45; preferentially, it is equal to 50:50.

According to one embodiment, the composition according to the invention comprises:

(a) from 35% to 65% by weight of polyurethane(s) as defined above, (b) from 33% to 60% by weight of tackifying resin(s) (b) as defined above, (c) at least one polymerization inhibitor, (d) from 0% to 3% by weight of radical photoinitiator(s), (e) from 0% to 20% by weight of at least one additive chosen from adhesion promoters, rheological agents, thixotropic agents, plasticizers, opacifying agents, pigments, dyes and fillers.

The composition according to the invention can have a viscosity ranging from 1,000 to 50,000 mPa·s at 80° C. and preferably a viscosity ranging from 4,000 to 25,000 mPa·s at 80° C.

The composition according to the invention can have a viscosity ranging from 50, mPa·s to 500,000 mPa·s at a temperature varying from 40° C. to 160° C., preferably from 600 mPa·s to 100,000 mPa·s at a temperature varying from 60° C. to 100° C., preferentially from 1,200 mPa·s to 50,000 mPa·s at a temperature varying from 60° C. to 100° C., advantageously from 1,200 mPa·s to 10,000 mPa·s at a temperature ranging from 60° C. to 100° C., for example from 1,200 mPa·s to 5,000 mPa·s at a temperature ranging from 60° C. to 100° C.

This viscosity can be measured at 80° C. using a Brookfield RVT viscometer coupled with a heating module of Thermosel type of the Brookfield name, with a number 27 spindle at a rotational speed of 20 revolutions per minute.

The composition according to the invention advantageously has:

a content of residual polyisocyanate monomers (resulting from stage E1) and in particular of diisocyanate monomers of less than or equal to 0.1% by weight, with respect to the total weight of the said composition; and/or a content of residual hydroxylated ester of (meth)acrylic acid or of residual hydroxylated amide of (meth)acrylic acid (resulting from stage E2) of less than or equal to 0.2% by weight, preferentially of less than or equal to 0.02% by weight, with respect to the total weight of the said composition;

the percentages by weight being with respect to the total weight of the said composition.

The principle of the analytical method for the determination of the concentration of free diisocyanate monomers is based on the specific reaction of the isocyanate NCO group with an amine (1-(2-methoxyphenyl)piperazine or PPZ) to form stable urea derivatives. These derivatives are obtained during the preparation of the adhesive sample by dilution/dissolution of this sample using a 0.02 mol/l solution of PPZ in acetonitrile. The PPZ derivatives formed from the isocyanates present in the sample to be analysed are subsequently quantitatively determined by a reversed-phase C18 High Performance Liquid Chromatography (HPLC) system with a mobile phase gradient comprising a mixture of water and acetonitrile buffered using a 0.2% by weight aqueous tetrabutylammonium bisulfate solution, at a pH ranging from 2 to 3, provided with an Ultra-Violet (UV) detector operating at 254 nm. These compounds are identified and quantified by comparing their retention times and their surface areas of chromatographic peaks with those of the standard PPZ derivatives obtained by reaction of a diisocyanate monomer of known nature and concentration.

The concentration of residual hydroxylated ester of (meth)acrylic acid or of residual hydroxylated amide of (meth)acrylic acid can be measured by a High Performance Liquid Chromatography system, for example using a UPLC device from Waters Acquity. The samples can be prepared by dilution of 0.2 g in an acetonitrile/water (or methanol/water) mixture with a volume of 10 ml. The sample prepared is subsequently quantitatively determined by reversed-phase C18 UPLC with a mobile phase gradient comprising a mixture of acetonitrile (or of methanol) and of $H_3PO_4$ additivated with orthophosphoric acid, at a column temperature of 30° C. The compounds are identified and quantified by comparing their retention times and their surface areas of chromatographic peaks with those of the standard derivatives obtained by reaction of a hydroxylated ester (or hydroxylated amide) of (meth)acrylic acid of known nature and concentration.

Preferably, the composition comprises a total content of (meth)acrylate monomer(s) (apart from the residual hydroxylated esters or hydroxylated amides of (meth)acrylic acid) strictly of less than 0.5% by weight, preferentially of less than 0.1% by weight and more advantageously still of less than 0.01% by weight, with respect to the total weight of the composition. Mention may in particular be made, among the (meth)acrylate monomer(s), of alkoxylated tetrahydrofurfuryl acrylate, isobornyl acrylate, tetrahydrofurfuryl acrylate, caprolactone acrylate, 2-(2-ethoxyethoxy) ethyl acrylate, 2-phenoxyethyl acrylate, tetrahydrofurfuryl methacrylate, isooctyl acrylate, 2-octyl acrylate, 2-ethylhexyl acrylate and their mixtures.

B. Process for the Preparation of the Composition

Another subject-matter of the invention relates to a process for the preparation of an abovementioned composition comprising:
- a stage of preparation of a polyurethane (a) as defined above;
- the stage of mixing the said polyurethane (a) with the other compounds of the composition.

According to a preferred alternative form according to the invention, the process for the preparation of the composition according to the invention comprises:
(i) a stage of melting the tackifying resin(s) (b), if appropriate as a mixture with one or more polymerization inhibitor(s) (c), at a temperature T3,
(ii) a stage of incorporation and of mixing, under an inert atmosphere, of the polyurethane(s) (a),
(iii) a stage of cooling the said mixture, to a temperature T4 of less than T3, then
(iv) an optional stage of incorporation, in the said mixture, of the crosslinking radical photoinitiator(s) (d) and, if appropriate, of the other additive(s) (e).

Stage (i) can take place at a temperature T3 greater than or equal to the softening temperature of the tackifying resin and, in the case of a resin mixture, at a temperature T3 greater than or equal to the greatest of the softening temperatures of the resins used. In particular, the temperature T3 is less than 150° C., preferably less than or equal to 130° C.

Preferably, the temperature T3 ranges from 70° C. to 150° C., more preferentially from 75° C. to 130° C.

In stage (ii), the addition of the polyurethane(s) (a) can be carried out in instalments. This is because the total amount of polyurethane(s) to be introduced can be split into as many portions as necessary so as to prevent an excessively great fall in the temperature of the mixture, related to the introduction of a significant volume of polyurethane(s), from solidifying the reaction medium.

The process can comprise, between each of the preceding stages (i) to (iv), a stage of dehydration under vacuum, so as to work under optimal anhydrous conditions. Each dehydration stage can be carried out under a reduced pressure of 10 to 50 millibars (mbar), for a period of time ranging from 1 hour 30 minutes to 3 hours and preferably from 2 hours to 3 hours.

Stage (iii) generally takes place at a temperature T4 lower than the temperature T3. Preferably, the temperature T4 ranges from 45° C. to 90° C., more preferentially from 70° C. to 80° C.

C. Uses

The present invention relates to the use of the abovementioned adhesive composition in the preparation of a self-adhesive support.

Another subject-matter of the present invention is a self-adhesive support capable of being obtained by a process comprising the following stages:
(i') preheating of the composition as defined above to a temperature T5 in order to obtain a liquid having a viscosity of less than 10 000 mPa·s at T5,
(ii') coating of the said composition onto a support layer, then
(iii') crosslinking of the said composition by irradiation under a UV beam or under e-beam electron radiation, with an irradiation time of between 1 second and 2 minutes, preferentially between 1 second and 1 minute.

Stage (i') can be carried out at a temperature T5 ranging from 70° C. to 150° C., preferably at a temperature T5 ranging from 75° C. to 130° C.

Stage (ii') of coating of the support layer can be carried out by means of known coating devices, such as, for example, a lip nozzle or a nozzle of curtain type, with a roller, or a manual coating device also known as film drawer or film applicator. It employs a weight per unit area of composition which can range from 20 to 100 $g/m^2$.

The material which can be used for the support layer is, for example, paper or a film of a polymeric material having one or more layers. Mention may be made, by way of example, of a PolyEthylene Terephthalate (PET) support.

The time necessary for the crosslinking of stage (iii') can vary within wide limits, for example between 1 second and 2 minutes.

This UV crosslinking stage has the effect in particular of creating—between the polymeric chains of the polyurethane used according to the invention and under the action of UV radiation—bonds of carbon-carbon type which result in the formation of a three-dimensional polymeric network. The adhesive composition thus crosslinked is a pressure-sensitive adhesive which confers, on the support layer which is coated with it, the desirable adhesiveness and tack.

Finally, the adhesive seal formed after application to a substrate of the support layer coated with the crosslinked composition advantageously provides for the attachment of the said support layer within a temperature range extending from −60° C. to +160° C.

The self-adhesive support according to the invention can also comprise a protective non-stick layer covering the PSA layer, the said protective layer being simply laminated.

The present invention also relates to the use of the self-adhesive support defined above in the manufacture of self-adhesive labels and/or tapes.

The weight per unit area of adhesive composition necessary for the manufacture of self-adhesive labels can range from 20 to 100 $g/m^2$, preferably in the vicinity of 50 $g/m^2$. That necessary for the manufacture of self-adhesive tapes can vary within a much wider range extending from 2 to 1,000 $g/m^2$, preferably from 15 to 250 $g/m^2$.

In the context of the invention, the term "of between x and y" or "ranging from x to y" is understood to mean an interval in which the limits x and y are included. For example, the range "of between 0% and 25%" includes in particular the values 0% and 25%.

The invention is now described in the following implementational examples, which are given purely by way of illustration and should not be interpreted in order to limit the scope thereof.

EXAMPLES

The following ingredients were used:
Desmodur® T 100: toluene diisocyanate (TDI) exhibiting 99.5% by weight of NCO functional groups and comprising 95% by weight of 2,4-TDI isomer (available from Covestro);
Voranol® P 2000: difunctional polypropylene glycol exhibiting a hydroxyl number OHN ranging from 250 to 270 mg KOH/g (available from Dow);
Voranol® CP 3355: trifunctional polypropylene glycol exhibiting a hydroxyl number OHN ranging from 48 mg KOH/g (available from Dow);

Acclaim® 4200: difunctional polypropylene glycol exhibiting a hydroxyl number OHN ranging from 26.5-29.5 mg KOH/g (available from Covestro);

Acclaim® 8200: difunctional polypropylene glycol exhibiting a hydroxyl number OHN ranging from 13 to 15 mg KOH/g (available from Covestro);

HEA: 2-hydroxyethyl acrylate exhibiting a purity of 98.5% by weight and containing 250±50 ppm of HQME, available from BASF;

Borchi Kat® 315: catalyst based on bismuth neodecanoate (available from Borchers);

Dertophene® H150: tackifying resin of terpene/phenol type available from DRT having a molar mass equal to approximately 630 Da, a softening temperature of 118° C. and a hydroxyl number ranging from 135 to 150 mg KOH/g;

Sylvalite® RE 100: tackifying resin of ester of pentaerythritol and of tall oil rosin type available from Arizona Chemical having a molecular weight equal to approximately 1700 Da and a softening temperature of 100° C.;

Speedcure® TPO-L: ethyl (2,4,6-trimethylbenzoyl)phenylphosphinate (CAS: 84434-11-7) available from Lambson.

A. Preparation of the Polyurethanes Comprising (Meth) Acrylic Functional Groups T The polyol(s) is (are) dried before being reacted with the polyisocyanate(s) used in the synthesis of the polyurethane having NCO end groups. The amounts of diisocyanate and of diol used in Examples 1 to 4 correspond to an NCO/OH molar ratio, denoted (r1), ranging from 1.65 to 1.75 approximately.

For each of the polyurethanes P comprising end functional groups T of Examples 1 to 3 obtained, the content of NCO in the medium for synthesis of the polyurethane is quantitatively determined according to Standard NF T52-132. The values measured are expressed as percentage by weight, with respect to a 100 g sample.

For each of the polyurethanes comprising end functional groups T of Examples 1 to 3 obtained, the content by weight of unreacted diisocyanate monomer present in the medium for synthesis of the polyurethane is measured by a method of HPLC provided with a UV detector as described above (reversed-phase C18, mobile phase: aqueous acetonitrile solution, buffered with a 0.2% by weight aqueous tetrabutylammonium bisulfate solution at pH equal to 2.5, detection wavelength: 254 nm). The values measured are expressed as percentage by weight and are subsequently related to the total weight of the polyurethane having (meth)acrylic end functional groups T. The content of residual diisocyanate monomer in each of the polymers of Examples 1 to 3 is less than 0.02% by weight and preferentially not detected at the threshold of 0.01% by weight by GC or HPLC.

Example 1: Preparation of a Polyurethane P1

6.52 g of Desmodur® T 100 are introduced into a reactor and heating is carried out to 40° C. 88.90 g of Acclaim® 4200 (i.e., $r_1$=1.68 and f=2) are subsequently introduced, care being taken that the temperature of the mixing does not exceed 80° C. When the mixing temperature has stabilized, the mixture is heated at 80-85° C. for approximately 1 hour. The end of the reaction is followed by monitoring the percentage by weight of NCO functional groups in the medium, this percentage having to be, in theory, approximately 1.28% by weight. When the reaction is complete, the mixture is cooled to 70° C. and 0.12 g of HQME, 4.36 g of 2-hydroxyethyl acrylate (i.e., $r_2$=0.81) and 0.13 g of Borchi Kat® 315 are introduced. The mixture is maintained at 70° C. for 6 to 8 hours while monitoring the percentage by weight of NCO functional groups in the medium, this percentage having to be, in theory, approximately 0.24%, and until there are no longer OH functional groups visible in the infrared (IR).

The content of (meth)acrylic end functional groups T of the polyurethane is 0.2400 meq/g.

The mean functionality of functional groups T of above-mentioned formula (I) in the polyurethane P1 is equal to 2.

Example 2: Preparation of a Polyurethane P2

6.81 g of Desmodur® T 100 are introduced into a reactor and heating is carried out to 40° C. Subsequently, in turn, 5.29 g of Voranol® CP 3355 and then 82.97 g of Acclaim® 4200 (i.e., $r_1$=1.70 and f=2.07) are introduced, care being taken that the temperature of the mixing does not exceed 80° C. When the mixing temperature has stabilized, the mixture is heated at 80-85° C. for approximately 1 hour. The end of the reaction is followed by monitoring the percentage by weight of NCO functional groups in the medium, this percentage having to be, in theory, approximately 1.35% by weight. When the reaction is complete, the mixture is cooled to 70° C. and 0.12 g of HQME, 4.70 g of 2-hydroxyethyl acrylate (i.e., $r_2$=0.80) and 0.10 g of Borchi Kat®315 are introduced. The mixture is maintained at 70° C. for 6 to 8 hours while monitoring the percentage by weight of NCO functional groups in the medium, this percentage having to be, in theory, approximately 0.26%, and until there are no longer OH functional groups visible in the infrared (IR).

The content of (meth)acrylic end functional groups T of the polyurethane is 0.2499 meq/g.

The mean functionality of functional groups T of above-mentioned formula (I) in the polyurethane P2 is 2.07.

Example 3: Preparation of a Polyurethane P3

3.94 g of Desmodur® T 100 are introduced into a reactor and heating is carried out to 40° C. Subsequently, in turn, 5.59 g of Voranol® CP 3355 and then 87.55 g of Acclaim® 8200 (i.e., $r_1$=1.70 and f=2.13) are introduced, care being taken that the temperature of the mixing does not exceed 80° C. When the mixing temperature has stabilized, the mixture is heated at 80-85° C. for approximately 1 hour. The end of the reaction is followed by monitoring the percentage by weight of NCO functional groups in the medium, this percentage having to be, in theory, approximately 0.78% by weight. When the reaction is complete, the mixture is cooled to 70° C. and 0.12 g of HQME, 2.70 g of 2-hydroxyethyl acrylate (i.e., $r_2$=0.80) and 0.10 g of Borchi Kat®315 are introduced. The mixture is maintained at 70° C. for 6 to 8 hours while monitoring the percentage by weight of NCO functional groups in the medium, this percentage having to be, in theory, approximately 0.15%, and until there are no longer OH functional groups visible in the infrared (IR).

The content of (meth)acrylic end functional groups T of the polyurethane is 0.1462 meq/g.

The mean functionality of functional groups T of above-mentioned formula (I) in the polyurethane P3 is 2.13.

Measurement of the Viscosities

The viscosity of the polyurethanes P1 to P3 comprising end functional groups T is estimated by measuring the viscosity of the mixture at 23° C. This measurement is carried out 24 hours after the end of reaction (D+1) at 23° C. using a Brookfield RVT viscometer, with a number 6 spindle at a rotational speed of 20 revolutions per minute (rev/min). The value measured is expressed in millipascal·second (mPa·s) and is recorded in Table 1.

TABLE 1

| Characterization of the polyurethane | P1 | P2 | P3 |
|---|---|---|---|
| Viscosity at 23° C. (mPa · s) | 44,200 | 103,4000 | 92,800 |

B. Preparation of the Hot-Melt Pressure-Sensitive Adhesive Compositions

The compositions 1A to 5A were prepared from the polyurethane/(meth)acrylics P1 to P3 comprising (meth) acrylic end functional groups T of Examples 1 to 3 obtained above without undergoing a purification stage.

Examples 1A, 3A and 4A illustrate adhesive compositions according to the invention comprising the polyurethane/(meth)acrylics P1, P2 and P3, respectively obtained in Examples 1, 2 and 3, with the tackifying resin Dertophene® H150 of type (b1) available from DRT with a molar mass equal to approximately 630 Da, a softening temperature of 118° C. and a hydroxyl number ranging from 135 to 150 mg KOH/g.

Example 2A corresponds to a comparative composition comprising the polyurethane/(meth)acrylic P1 obtained in Example 1 but with a polyurethane P1:tackifying resin ratio by weight outside the range 4:6 to 6:4.

Example 5A corresponds to a comparative composition comprising the polyurethane/(meth)acrylic P1 obtained in Example 1 but with a different tackifying resin from that according to the invention.

Experimental Protocol:

The composition 1A is prepared by introducing first of all the tackifying resin and the antioxidants into a glass reactor under vacuum and heated to a temperature T3 greater than or equal to the softening temperature of the tackifying resin and less than or equal to 130° C. Then, once the resin is well melted, the vacuum is shut off and half of the polyurethane/(meth)acrylic P1 obtained in the preceding Example 1 is introduced under nitrogen. The mixture is maintained at a temperature T3 with constant stirring. After addition, the mixture is left stirring under vacuum for at least two hours, then the vacuum is again shut off and the other half of the polyurethane/(meth)acrylic P1 is introduced under nitrogen while keeping the mixture stirred at a temperature T3. The medium is subsequently cooled to a temperature T4, at 80° C. approximately, the vacuum is shut off and then the radical photoinitiator Speedcure® TPO-L is introduced under a nitrogen atmosphere with vigorous stirring. After addition, the vacuum is re-established and the mixture is stirred for an additional 10 minutes.

The adhesive composition obtained is stored in a water-tight aluminium cartridge pre-dried in an oven at 100° C.

The experimental protocol applied for Example 1A is repeated in the same way for Examples 2A to 5A, taking into account the ingredients appearing in Table 2.

TABLE 2

| Ingredients of the adhesive composition | 1A | 2A (comparative) | 3A | 4A | 5A (comparative) |
|---|---|---|---|---|---|
| P1 | 51.5 | 29.0 | — | — | 51.5 |
| P2 | — | — | 51.5 | — | — |
| P3 | — | — | — | 51.5 | — |

TABLE 2-continued

| Ingredients of the adhesive composition | 1A | 2A (comparative) | 3A | 4A | 5A (comparative) |
|---|---|---|---|---|---|
| Dertophene ® H150 | 47.5 | 70.0 | 47.5 | 47.5 | — |
| Sylvalite RE100 | — | — | — | — | 47.5 |
| Radical photoinitiator | 1.0 | 1.0 | 1.0 | 1.0 | 1.0 |

Characterizations:

The following measurements are carried out in the same way on the different adhesive compositions 1A to 5A obtained:

The viscosity of the adhesive composition is measured at 80° C. using a Brookfield RVT viscometer coupled with a heating module of Thermosel type of the Brookfield name, with a number 27 spindle at a rotational speed of 20 revolutions per minute. This viscosity is expressed in millipascal·second.

In addition, the general appearance of each adhesive composition was evaluated visually (visible light). The adhesive compositions 1A to 5A are all transparent.

The viscosity values measured are combined in Table 3.

TABLE 3

| Characteristics of the adhesive composition | 1A | 2A (comparative) | 3A | 4A | 5A (comparative) |
|---|---|---|---|---|---|
| Viscosity at 80° C. (Pa · s) | 15 | 40.5 at 100° C. as solid at 80° C. | 22.7 | 19.6 | 3.25 |

C. Measurements

Preparation of a PET Support Layer Coated with the Cross-linked Adhesive Composition, in a Proportion of 50 q/m²:

A rectangular sheet of polyethylene terephthalate (PET) with a thickness of 50 μm and with dimensions of 20 cm by 40 cm is used as support layer.

The composition 1A obtained is preheated to a temperature T5 ranging from 70° C. to 150° C. and preferably from 100° C. to 120° C. and is introduced into a cartridge, from where a strand is extruded which is deposited close to the edge of the sheet parallel to its width.

The composition included in this strand is subsequently distributed over the whole of the surface of the sheet, so as to obtain a uniform layer of substantially constant thickness. Use is made, for this, of a film drawer (also known as film applicator) which is moved from the edge of the sheet to the opposite edge. A layer of composition corresponding to a weight per unit area of 50 g/m² is thus deposited, which represents approximately a thickness of the order of 50 μm.

The sheet is then laminated onto a protective non-slip layer consisting of a silicone film, which is rectangular and of the same dimensions.

The complex of PET/silicone film thus coated is then placed under a UV beam (mercury lamp), preferably for 1 minute.

The PET support layer thus obtained is subjected to the tests described below.

The experimental protocol applied and the tests carried out for the multilayer system obtained using the composition 1A are repeated in the same way for Examples 2A to 5A.

180° Peel Test on a Sheet of Stainless Steel:

The adhesiveness is evaluated by the 180° peel test on a sheet of stainless steel, as described in the FINAT No. 1 method, published in the FINAT Technical Handbook, 6th edition, 2001. FINAT is the International Federation for Self-Adhesive Label Manufacturers and Converters. The principle of this test is as follows:

A test specimen in the form of a rectangular strip (25 mm×150 mm) is cut out from the PET support layer coated with the crosslinked composition obtained above. This test specimen is attached over ⅔ of its length (after removal of the corresponding portion of nonstick protective layer) to a substrate consisting of a degreased sheet of stainless steel, by applying two passes of a 1 kilo roller. The assembly obtained is left at ambient temperature for 15 minutes. It is then placed in a tensile testing device capable, starting from the end of the rectangular strip which has remained free, of carrying out the peeling or detachment of the strip under an angle of 180° and with a rate of separation of 300 mm per minute. The device measures the force required to detach the strip under these conditions. The results are expressed in newtons per centimetre (N/cm) and are shown in the following table 4.

Furthermore, the failure facies is measured visually, according to the state of the detached surfaces. "AF" is recorded for adhesive failure, when it is observed that all of the adhesive seal has remained adhesively bonded to the PET support layer. "CF" is recorded for cohesive failure, when it is observed that the adhesive seal has broken and has remained for one part adhesively bonded to the PET support layer and for the other part adhesively bonded to the substrate. The results are shown in table 4.

Tack Test (Also Known as Loop Test):

The tack is evaluated by the "loop" tack test described in the FINAT No. 9 method, the principle of which is as follows:

A test specimen in the form of a rectangular strip (25 mm×150 mm) is cut out from the PET support layer coated with the crosslinked composition obtained above. After removing all of the protective non-stick layer, the 2 ends of this strip are joined so as to form a loop, the adhesive layer of which is directed toward the outside. The 2 joined ends are placed in the movable jaw of a tensile testing device capable of imposing a rate of displacement of 300 mm/minute along a vertical axis with to-and-fro possibility. The lower part of the loop placed in the vertical position is first brought into contact with a horizontal sheet of glass of 25 mm by 30 mm over a square region with a side length of approximately 25 mm. Once this contact has occurred, the direction of displacement of the jaw is reversed. The tack is the maximum value of the force necessary for the loop to become completely detached from the sheet. The results are expressed in newtons per centimetre squared (N/cm$^2$) and are shown in Table 4.

Furthermore, the failure facies is measured visually, according to the state of the detached surfaces. "AF" is recorded for adhesive failure: in particular, it is observed that all of the adhesive seal has remained adhesively bonded to the PET support layer. "CF" is recorded for cohesive failure: it is observed that the adhesive seal has broken and has remained for one part adhesively bonded to the PET support layer and for the other part adhesively bonded to the substrate. The results are shown in table 4.

Temperature Resulting in the Failure of the Adhesive Seal with Static Shearing:

The temperature maintenance of the adhesiveness is evaluated by the test of determination of the temperature resulting in the failure of the adhesive seal with static shearing. This test is also known under the name of Shear Adhesion Failure Temperature (or SAFT) test.

A test specimen in the form of a rectangular strip (25 mm×75 mm) is cut out in each from a PET/adhesive (50 g/m$^2$)/release liner multilayer after crosslinking of the adhesive under UV irradiation. After removal of all of the protective layer (or release liner), a square portion with a side length of 25 mm located at the end of the adhesive strip is attached to a sheet of stainless steel. The test sheet thus obtained is placed, by means of an appropriate support, in a substantially vertical position in an oven at 23° C., the non-adhesively bonded part of the strip with a length of 50 mm being located below the sheet. After thermal equilibrium at 23° C. has been reached, the part of the strip which has remained free is connected to a 0.5 kg weight, the whole of the device subsequently remaining in the oven throughout the duration of the test. The SAFT value is subsequently measured in accordance with the PSTC-17 test method with a rise in temperature of the oven of 0.4° C. per minute. The temperature at which the strip falls off the sheet following the failure of the adhesive seal under the effect of this stress is recorded.

In the present test, it was checked if the adhesive always withstands a temperature of 170° C.

TABLE 4

| Tests of the crosslinked adhesive composition on a support | 1A | 2A (comparative) | 3A | 4A | 5A (comparative) |
|---|---|---|---|---|---|
| SAFT (170° C.) | Yes | No | Yes | Yes | No |
| 180° Peel on stainless steel (N/cm) | 30.0 | 0.0 | 19.0 | 20.5 | 0.3 |
| Loop tack on glass (N/cm$^2$) | 16.9 | 0.0 | 19.4 | 35.7 | 0.0 |
|  | AF | AF | AF | AF | AF |

Thus, all the adhesives obtained from Examples 1A, 3A and 4A according to the invention result in satisfactory adhesive performances in terms of adhesive force and of tack. In addition, the values obtained on conclusion of the peel test and on conclusion of the loop tack test are strictly greater than 2 N/cm$^2$ respectively, which are the minimum values desired in order to obtain a self-adhesiveness.

In addition, the compositions of Examples 1A, 3A and 4A advantageously exhibit a good temperature resistance (SAFT 170° C.), unlike the compositions 2A and 5A.

For Comparative Examples 2A and 5A, these combined conditions are not met, and in fact the adhesive obtained is not very effective and is not suitable as self-adhesive.

The composition 1A differs from the comparative composition 5A in the nature of the tackifying resin. The composition 1A results in an adhesive exhibiting better properties of adhesion and of tack, and of high-temperature resistance than that obtained with the composition 5A.

The composition 1A differs from the comparative composition 2A in the polyurethane P1:tackifying resin b) ratio by weight. The composition 1A results in an adhesive exhibiting better properties of adhesion and of tack, and of high-temperature resistance than that obtained with the composition 2A.

The invention claimed is:

1. A hot-melt, pressure-sensitive adhesive composition comprising:
   a) at least one polyurethane comprising at least two end functional groups T of following formula (I):

[Chem 20]

$$—X—(C{=}O)—CH(R^V){=}CH_2 \quad (I)$$

wherein $R^V$ represents a hydrogen atom or a methyl radical and X represents —O— or —NR$^{\prime N}$— with R$^{\prime N}$ representing a hydrogen atom or a linear or branched alkyl radical comprising from 1 to 20 carbon atoms;
  b) at least one tackifying resin chosen from the following resins:
    (b1) terpene/phenolic resins;
    (b2) resins resulting from polymerization of α-methylstyrene, optionally followed by a reaction with at least one phenol;
    (b3) polymeric resins resulting from mainly $C_9$ aromatic fractions; and
  c) at least one polymerization inhibitor;
wherein:
  the polyurethane(s) (a): tackifying resin(s) (b) ratio by weight ranges from 4:6 to 6:4.

2. The composition according to claim 1, wherein the total content by weight of polyurethane(s) (a) ranges from 30% to 70% by weight, with respect to the total weight of the composition.

3. The composition according to claim 1, wherein the polyurethane (a) comprising at least two end functional groups T of formula (I) is prepared by a process comprising the following stages:
  E1) preparing a polyurethane comprising at least two NCO end functional groups by a polyaddition reaction:
    i. of at least one polyisocyanate;
    ii. with at least one polyol;
  in amounts such that the NCO/OH molar ratio, denoted (r1), is strictly greater than 1; and
  E2) reacting the product formed on conclusion of stage E1) with at least one hydroxylated ester of (meth)acrylic acid or at least one hydroxylated amide of (meth)acrylic acid, in amounts such that the OH/NCO molar ratio, denoted (r2), is less than or equal to 1.00.

4. The composition according to claim 3, wherein:
  the hydroxylated ester of (meth)acrylic acid has the following formula (II):

[Chem 21]

$$CH_2=CR^V-C(=O)-O-R^{AC}-OH \qquad (II)$$

wherein $R^V$ represents a hydrogen atom or a methyl radical and $R^{AC}$ represents a saturated or unsaturated, aliphatic or cyclic, linear or branched, divalent hydrocarbon radical comprising from 2 to 240 carbon atoms, and/or optionally interrupted by one or more heteroatoms, and/or optionally interrupted by one or more divalent $-N(R''^N)-$ with $R''^N$ representing a linear or branched alkyl radical comprising from 1 to 22 carbon atoms, $-C(=O)O-$, $-C(=O)NH-$, $-NHC(=O)O-$, $-NHC(=O)-NH-$ or $-C(=O)-$ groups, and/or optionally substituted;
  the hydroxylated amide of (meth)acrylic acid has the following formula (II'):

[Chem 22]

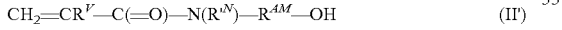

$$CH_2=CR^V-C(=O)-N(R^{iN})-R^{AM}-OH \qquad (II')$$

wherein $R^V$ represents a hydrogen atom or a methyl radical, $R^{iN}$ represents H or an alkyl radical comprising from 1 to 22 carbon atoms, and $R^{AM}$ represents a saturated or unsaturated, aliphatic or cyclic, linear or branched, divalent hydrocarbon radical comprising from 1 to 240 carbon atoms, and/or optionally interrupted by one or more heteroatoms, and/or optionally interrupted by one or more divalent $-N(R''^N)-$ with $R''^N$ representing a linear or branched alkyl radical comprising from 1 to 22 carbon atoms, $-C(=O)O-$, $-C(=O)NH-$, $-NHC(=O)O-$, $-NHC(=O)-NH-$ or $-C(=O)-$ groups, and/or optionally substituted.

5. The composition according to claim 3, wherein the polyol(s) which can be used is (are) chosen from those, the number-average molar mass (Mn) of which ranges from 2,000 to 12,000 g/mol.

6. The composition according to claim 3, wherein stage E1) is carried out in the presence of a diol having a number-average molecular weight (Mn) of greater than or equal to 4000 g/mol, or in the presence of a mixture of polyols comprising one or more diol(s), the number-average molecular weight (Mn) of which is greater than or equal to 4000 g/mol.

7. The composition according to claim 6, wherein all the diols used necessarily have a number-average molecular weight (Mn) of greater than or equal to 4,000 g/mol.

8. The composition according to claim 3, wherein stage E1) is carried out:
  with a single diol with a number-average molecular weight (Mn) of greater than or equal to 4,000 g/mol; or
  with a mixture of a diol with a number-average molecular weight (Mn) of greater than or equal to 4,000 g/mol and of a triol having a number-average molecular weight (Mn) of greater than or equal to 2,000 g/mol.

9. The composition according to claim 3, wherein the polyisocyanate(s) of stage E1) is (are) chosen from the group consisting of toluene diisocyanate, meta-xylylene diisocyanate, isophorone diisocyanate, HDI allophanates and their mixtures.

10. A hot-melt, pressure-sensitive adhesive composition comprising:
  a) at least one polyurethane comprising at least two end functional groups T of following formula (I):
  wherein $R^V$ represents a hydrogen atom or a methyl radical and X represents $-O-$ or $-NR^{iN}-$ with $R^{iN}$ representing a hydrogen atom or a linear or branched alkyl radical comprising from 1 to 20 carbon atoms;
  b) at least one tackifying resin chosen from the following resins:
    (b1) terpene/phenolic resins;
    (b2) resins resulting from polymerization of a-methylstyrene, optionally followed by a reaction with at least one phenol;
    (b3) polymeric resins resulting from mainly C9 aromatic fractions; and
  c) at least one polymerization inhibitor;
  wherein the polyurethane(s) (a):tackifying resin(s) (b) ratio by weight ranges from 4: 6 to 6: 4, and wherein the polyurethane (a) is obtained by a process comprising the following stages:
  E1) preparing a polyurethane comprising at least two NCO end functional groups by polyaddition reaction:
    i. of at least one diisocyanate chosen from the group consisting of toluene diisocyanate, meta-xylylene diisocyanate, isophorone diisocyanate, HDI allophanates and their mixtures;
    ii. with at least one polyether diol having a number-average molecular weight (Mn) of greater than or equal to 4,000 g/mol, or with a mixture of polyether diol having a number-average molecular weight (Mn) of greater than or equal to 4,000 g/mol with a polyether triol having a number-average molecular weight (Mn) of greater than or equal to 2,000 g/mol;
  E2) reacting the product formed on conclusion of stage E1) with at least one hydroxylated ester of acrylic acid of formula (II-1-1):

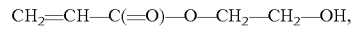

$$CH_2=CH-C(=O)-O-CH_2-CH_2-OH,$$

in amounts such that the OH/NCO molar ratio (denoted r2) is less than or equal to 1.00.

11. The composition according to claim 1, wherein the terpene/phenolic resin (b1) is a phenol-modified terpene resin obtained by polymerization of terpene hydrocarbons in the presence of at least one Friedel-Crafts catalyst, followed by a reaction with at least one phenol.

12. A hot-melt, pressure-sensitive adhesive composition comprising:
    a) at least one polyurethane comprising at least two end functional groups T of following formula (I):
    wherein $R^V$ represents a hydrogen atom or a methyl radical and X represents —O— or —$NR^{tN}$— with $R^{tN}$ representing a hydrogen atom or a linear or branched alkyl radical comprising from 1 to 20 carbon atoms;
    b) at least one tackifying resin chosen from the following resins:
        (b1) terpene/phenolic resins;
        (b2) resins resulting from polymerization of a-methyl-styrene, optionally followed by a reaction with at least one phenol;
        (b3) polymeric resins resulting from mainly C9 aromatic fractions; and
    c) at least one polymerization inhibitor;
    wherein the polyurethane(s) (a):tackifying resin(s) (b) ratio by weight ranges from 4: 6 to 64, and wherein the adhesive composition does not comprise other tackifying resins than the tackifying resins (b1), (b2) and (b3).

13. The composition according to claim 1, wherein it comprises at least one polymerization inhibitor (c) in a content by weight of less than or equal to 3% by weight, with respect to the total weight of the composition.

14. The composition according to claim 1, wherein it comprises from 0% to 5% by weight of radical photoinitiator(s), with respect to the total weight of the composition.

15. The composition according to claim 1, wherein the polyurethane(s) (a): tackifying resin(s) (b) ratio by weight ranges from 45:55 to 55:45.

16. The composition according to claim 1, wherein it comprises:
    a. from 35% to 65% by weight of polyurethane(s) as defined above,
    b. from 33% to 60% by weight of tackifying resin(s) (b) as defined above,
    c. at least one polymerization inhibitor,
    d. from 0% to 3% by weight of radical photoinitiator(s),
    e. from 0% to 20% by weight of at least one additive chosen from adhesion promoters, rheological agents, thixotropic agents, plasticizers, opacifying agents, pigments, dyes and fillers.

17. A process for preparing the composition of claim 1, comprising:
    i. a stage of melting the tackifying resin(s) (b), if appropriate as a mixture with one or more polymerization inhibitor(s) (c), at a temperature T3 ranging from 70° C. to 150° C.,
    ii. a stage of incorporation and of mixing, under an inert atmosphere, of the polyurethane(s) (a),
    iii. a stage of cooling the said mixture, to a temperature T4 ranging from 45° C. to 90° C., which is less than T3, then
    iv. an optional stage of incorporation, in the said mixture, of the crosslinking radical photoinitiator(s) (d) and, if appropriate, of the other additive(s) (e) chosen from adhesion promoters, rheological agents, thixotropic agents, plasticizers, opacifying agents, pigments, dyes and fillers.

18. A self-adhesive support obtained by a process comprising the following stages:
    (i') preheating the composition of claim 1 to a temperature T5 in order to obtain a liquid having a viscosity of less than 10,000 mPa·s at T5 ranging from 70° C. to 150° C.,
    (ii') coating the said composition onto a support layer, then
    (iii') crosslinking the said composition by irradiation under a UV beam or under e-beam electron radiation, with an irradiation time of between 1 second and 2 minutes.

* * * * *